United States Patent
Lee et al.

(10) Patent No.: US 10,484,567 B2
(45) Date of Patent: Nov. 19, 2019

(54) IMAGE ACQUIRING APPARATUS AND METHOD AND IMAGE FORMING APPARATUS

(71) Applicant: HP PRINTING KOREA CO., LTD., Suwon-si, Gyeonggi-do (KR)

(72) Inventors: Kyoung-Youn Lee, Yogin-si (KR); Jung-Han Kim, Suwon-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 15/091,022

(22) Filed: Apr. 5, 2016

(65) Prior Publication Data
US 2017/0099407 A1    Apr. 6, 2017

(30) Foreign Application Priority Data
Oct. 6, 2015 (KR) .......... 10-2015-0140392

(51) Int. Cl.
| | | |
|---|---|---|
| H04N 1/00 | (2006.01) | |
| H04N 1/203 | (2006.01) | |
| H04N 1/409 | (2006.01) | |
| H04N 1/12 | (2006.01) | |

(52) U.S. Cl.
CPC .......... *H04N 1/2032* (2013.01); *H04N 1/121* (2013.01)

(58) Field of Classification Search
USPC ...... 358/1.1–3.23, 1.11–1.18, 504–506, 512, 358/514, 531–533, 537
See application file for complete search history.

(56) References Cited

U.S. PATENT DOCUMENTS

| | | | | |
|---|---|---|---|---|
| 2006/0263126 A1* | 11/2006 | Heydinger | ......... | G03G 15/5025 399/364 |
| 2007/0127091 A1* | 6/2007 | Hiranuma | ............ | H04N 1/4076 358/500 |
| 2008/0247003 A1* | 10/2008 | Jeong | .................... | H04N 1/4095 358/475 |
| 2012/0170083 A1* | 7/2012 | Joh | .................... | H04N 1/00013 358/475 |

(Continued)

FOREIGN PATENT DOCUMENTS

| | | |
|---|---|---|
| EP | 2166741 A1 | 3/2010 |
| EP | 2224721 A1 | 9/2010 |

(Continued)

OTHER PUBLICATIONS

Extended European Search Report dated Feb. 16, 2017 in related European Patent Application No. 16165798.6 (7 pages).

*Primary Examiner* — Marcellus J Augustin
(74) *Attorney, Agent, or Firm* — Staas & Halsey LLP

(57) ABSTRACT

Disclosed is an image acquiring method. The image acquiring method includes receiving an instruction to acquire a one-side image to acquire an image on a first side of a document; obtaining a penetrated image of the first side of the document, which is seen on the second side, with a second image sensor for obtaining an image on a second side of the document, while the document is being fed; obtaining an image on the first side of the document with a first image sensor for obtaining an image on the first side of the document, while the document is being fed; and processing the image on the first side based on the penetrated image of the first side.

16 Claims, 34 Drawing Sheets

(56) References Cited

U.S. PATENT DOCUMENTS

| | | | | |
|---|---|---|---|---|
| 2013/0135700 A1* | 5/2013 | Tamura | ............... | H04N 1/3873 358/530 |
| 2013/0136314 A1* | 5/2013 | Yamakawa | ............... | B41J 3/44 382/112 |

FOREIGN PATENT DOCUMENTS

| | | |
|---|---|---|
| EP | 2899963 A2 | 7/2015 |
| EP | 2899963 A3 | 8/2015 |
| JP | 2006-140762 | 6/2006 |
| JP | 2012-147382 | 8/2012 |
| KR | 10-2008-0113831 | 12/2008 |
| KR | 10-2010-0034901 | 4/2010 |

\* cited by examiner

IMAGE ACQUIRING APPARATUS AND METHOD AND IMAGE FORMING APPARATUS

CROSS-REFERENCE TO RELATED APPLICATION(S)

This application claims the benefit under 35 U.S.C. § 119(a) of a Korean patent application filed on Oct. 6, 2015 in the Korean Intellectual Property Office and assigned Serial No. 10-2015-0140392, the entire disclosure of which is incorporated hereby incorporated by reference.

BACKGROUND

1. Field

The present disclosure relates to an image acquiring apparatus and method and image forming apparatus, and more particularly, to an image acquiring apparatus and method and image forming apparatus using a plurality of image sensors.

2. Description of the Related Art

Generally, an image acquiring apparatus is to acquire an image formed on the surface of a document, and as a typical example of the image acquiring apparatus, there is a scanner for acquiring and storing an image formed on the surface of a document.

In addition to the scanner, the image acquiring apparatus may correspond to a facsimile for acquiring an image formed on the surface of a document and transmitting the image through communication, a copying machine for acquiring an image formed on the surface of a document and printing the image onto a print medium, and even a multi-functional device capable of performing functions of the scanner, facsimile, copying machine, and printer.

Recently, the image acquiring apparatus has evolved to one that may not only obtain an image on a single side of a document but also obtain images on both sides of a document. To obtain such double-side images of a document, the image acquiring apparatus is equipped with a plurality of image sensors.

SUMMARY

The present disclosure provides an image acquiring apparatus and method, and image forming apparatus, which uses a plurality of image sensors to acquire clearer and more natural images in acquisition of one-side image of a document.

The present disclosure also provides an image acquiring apparatus and method, and image forming apparatus, which processes an image of a document based on a penetrated image seen on the other side of the document in acquisition of one-side image of the document.

The present disclosure also provides an image acquiring apparatus and method, and image forming apparatus, allowing a clear rear-side image to be acquired in acquisition of one-side image of a document.

In accordance with an aspect of the present disclosure, an image acquiring method is provided. The image acquiring method includes receiving an instruction for acquiring a first image formed on a first surface of a document; obtaining a second image shown on a second surface of the document with a second image sensor while the document is being fed, the second image being corresponding to the first image shown through the second surface; obtaining the first image formed on the first surface with a first image sensor while the document is being fed; and processing the first image obtained by the first image sensor, based on the second image obtained by the second image sensor.

The obtaining of the second image comprises determining whether the second image is a text image or a picture image.

The processing of the first image comprises sharpening the first image if the second image is the text image.

The processing of the first image comprises blurring the first image if the second image is the picture image.

The obtaining of the first image comprises increasing feed speed of the document if the second image is the text image.

The obtaining of the first image comprises decreasing feed speed of the document if the second image is a picture image.

The obtaining of the second image comprises determining whether the second image is a monochrome image or a color image.

The obtaining of the first image comprises changing line times of the first image sensor to mono image line times if the second image is a monochrome image.

The obtaining of the first image comprises changing line times of the first image sensor to color image line times if the second image is a color image.

The obtaining of the second image comprises changing a black shading offset for the second image sensor.

The obtaining of the second image comprises changing a gamma value for the second image sensor.

In accordance with another aspect of the present disclosure, an image acquiring apparatus is provided. The image acquiring apparatus may include a user input unit configured to receive a single-side acquisition instruction for acquiring a first image formed on a first surface of a document; a document feed module configured to feed the document; a second image sensor configured to obtain a second image shown on a second surface of the document while the document is being fed, the second image being corresponding to the first image shown through the second surface; a first image sensor configured to obtain the first image formed on the first surface while the document is being fed; and a controller configured to process the first image obtained by the first image sensor, based on the second image obtained by the second image sensor.

The controller is configured to determine whether the second image is a text image or a picture image.

The controller is configured to sharpen the first image if the second image of the first side is a text image.

The controller is configured to blur the first image if the penetrated image of the first side is a picture image.

The controller is configured to increase feed speed of the document feed module if the second image is a text image.

The controller is configured to decrease feed speed of the document feed module if the second image is a picture image.

The controller is configured to determine whether the second image is a monochrome image or a color image.

The controller is configured to change line times of the first image sensor to mono image line times if the second image is a monochrome image.

The controller is configured to change line times of the first image sensor to color image line times if the second image is a color image.

The image acquiring apparatus may further include a reflecting member configured to reflect light emitted from the second image sensor and having penetrated the document The reflecting member may include a first reflecting part and a second reflecting part, the first reflecting part having higher optical reflectivity than the second reflecting part.

The user input unit further receives a double-side acquisition instruction to acquire the first image formed the first surface and the second image formed the second surface, and the image acquiring apparatus may further include a reflecting member moving module configured to move the reflecting member such that the first reflecting part is aligned with the second image sensor if the single-side acquisition instruction is input, and move the reflecting member such that the second reflecting part is aligned with the second image sensor if the double-side acquisition instruction is input.

the user input unit further receives a double-side acquisition instruction to acquire the first image formed the first surface and the second image formed the second surface, and the image acquiring apparatus may further include a sensor moving module configured to move the first image sensor such that the first reflecting part is aligned with the second image sensor if the single-side acquisition instruction is input, and move the first image sensor such that the second reflecting part is aligned with the second image sensor if the double-side acquisition instruction is input.

In accordance with another aspect of the present disclosure, an image forming apparatus is provided. The image forming apparatus includes a user input unit configured to receive a single-side acquisition instruction for acquiring a first image formed on a first surface of a document; a document feed module configured to feed the document; a second image sensor configured to obtain a second image shown on a second surface of the document while the document is being fed, the second image being corresponding to the first image shown through the second surface; a first image sensor configured to obtain the first image formed on the first surface while the document is being fed; an image former configured to print the first image obtained by the first image sensor onto a print medium; and a controller configured to process the first image obtained by the first image sensor, based on the second image obtained by the second image sensor and print the processed first image on the print medium.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other features and advantages of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

Embodiments of the present disclosure will now be described with reference to accompanying drawings.

Figure 1:
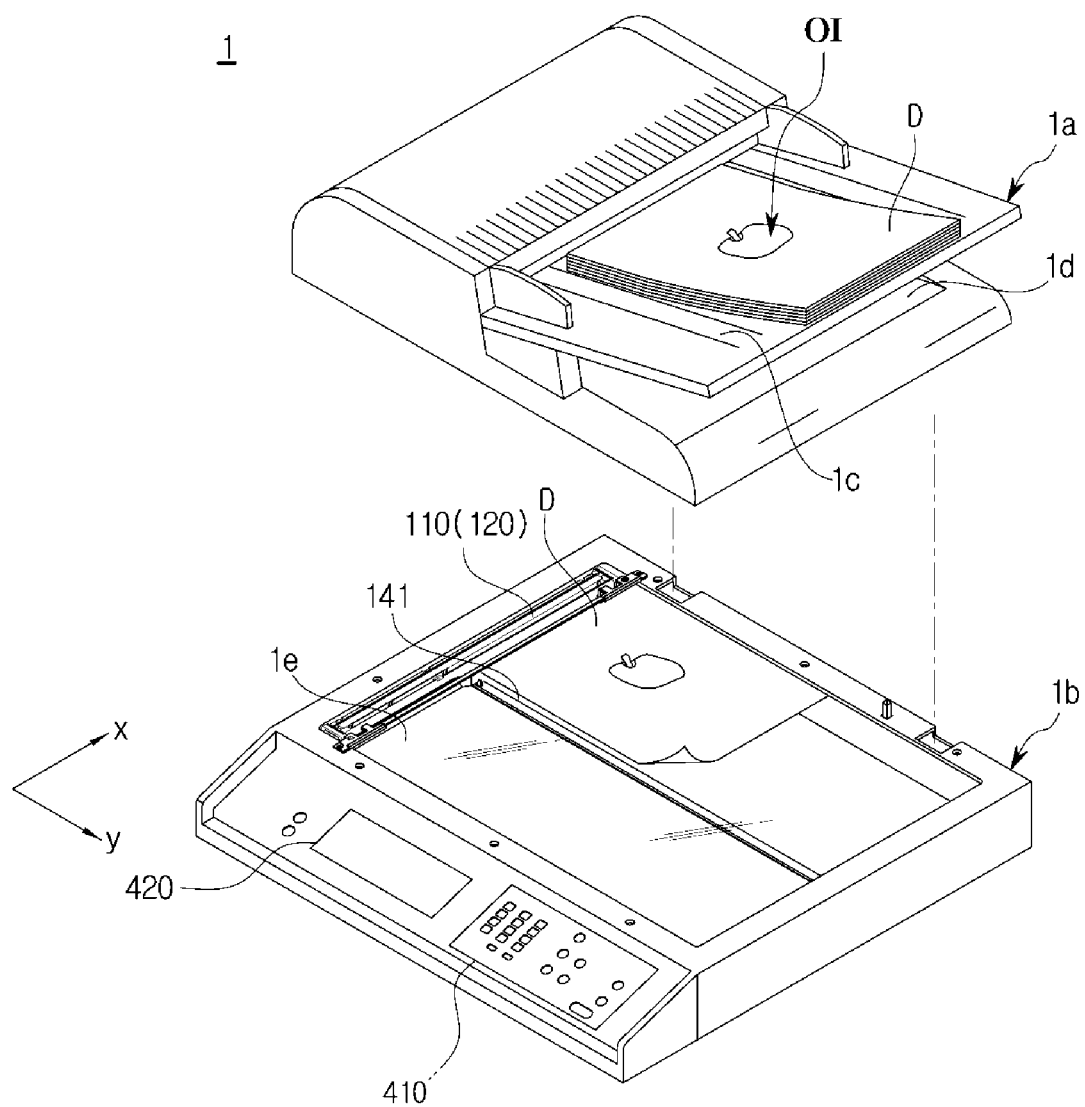
FIG. 1 illustrates an exterior view of an image acquiring apparatus, according to an embodiment of the present disclosure.
Figure 2:
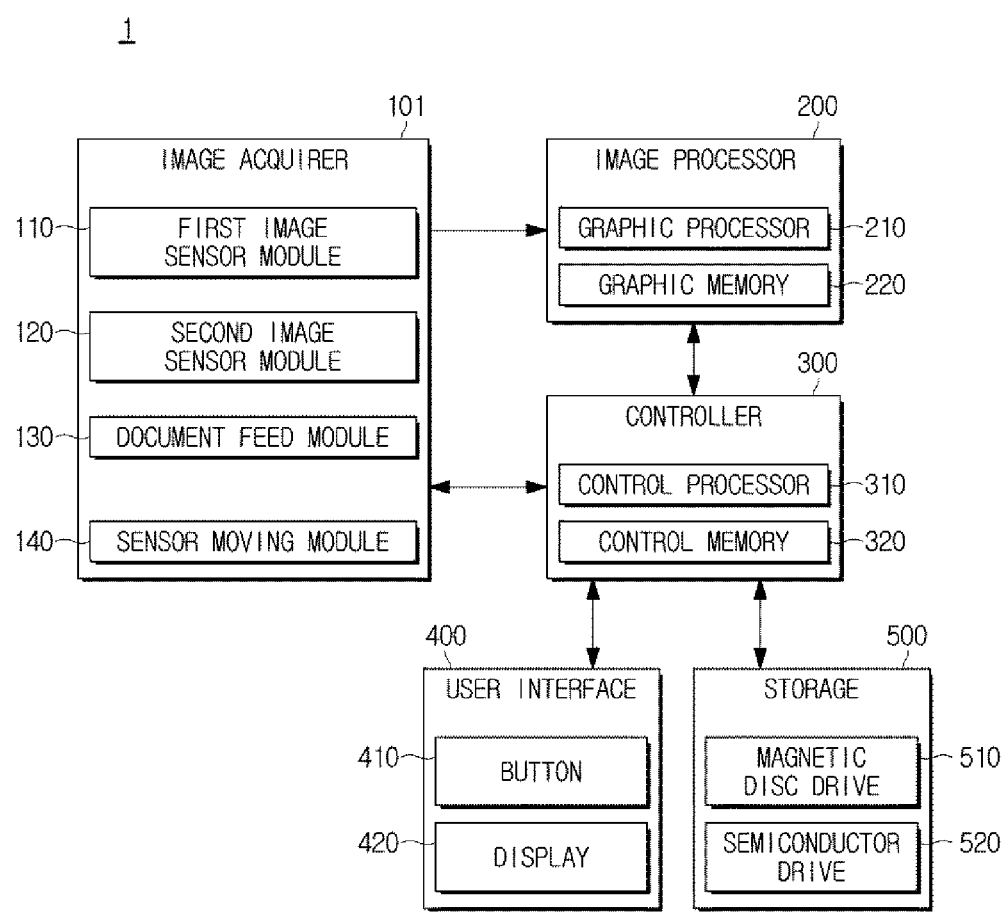
FIG. 2 is a block diagram of an image acquiring apparatus, according to an embodiment of the present disclosure.
Figure 3:
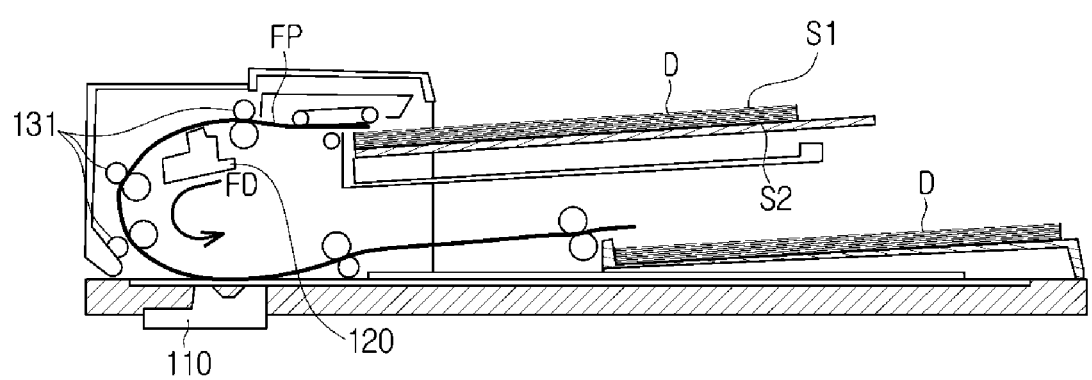
FIG. 3 illustrates arrangement of first and second image sensor modules included in an image acquiring apparatus, according to an embodiment of the present disclosure.
Figure 4:
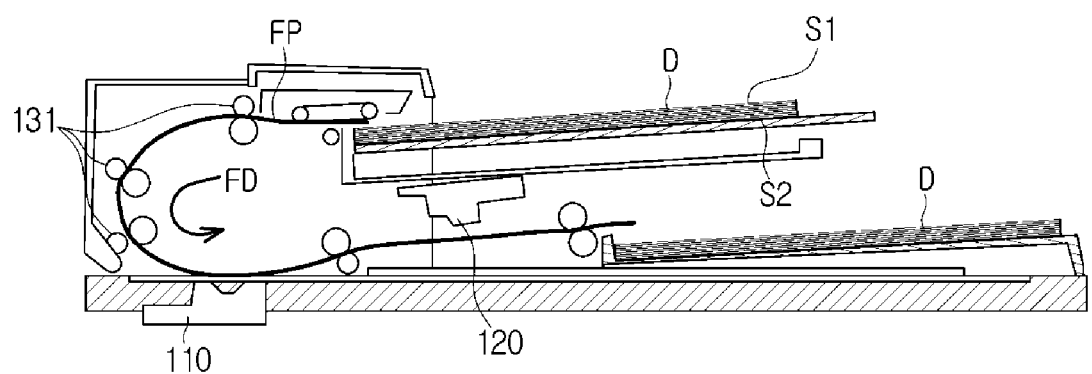
FIG. 4 illustrates arrangement of first and second image sensor modules included in an image acquiring apparatus, according to another embodiment of the present disclosure.

FIG. 1 illustrates an exterior view of an image acquiring apparatus, according to an embodiment of the present disclosure, and FIG. 2 is a block diagram of an image acquiring apparatus, according to an embodiment of the present disclosure. Furthermore, FIG. 3 illustrates arrangement of first and second image sensor modules included in an image acquiring apparatus, according to an embodiment of the present disclosure, and FIG. 4 illustrates arrangement of first and second image sensor modules included in an image acquiring apparatus, according to another embodiment of the present disclosure.

An image acquiring apparatus 1 acquires an image formed on the surface of a document D. The document D as herein used refers to paper, film, cloth, etc., the surface of which has an image, such as characters, pictures, etc., formed thereon.

As a typical example of the image acquiring apparatus 1, there is a scanner for acquiring an image formed on the surface of the document D and storing the acquired image.

The image acquiring apparatus 1 is not, however, limited to the scanner, but may correspond to a facsimile for acquiring an image formed on the surface of the document D and transmitting the acquired image through communication, a copying machine for acquiring an image formed on the surface of the document D and printing the acquired image onto a print medium, or the like. In addition, the image acquiring apparatus 1 may correspond to a multifunctional device that is capable of performing functions of all the scanner, facsimile, copying machine, and printer.

Referring to FIG. 1, the image acquiring apparatus 1 may include, in appearance, a main body 1b and a flatbed cover 1a for covering the top face of the main body 1b.

The main body 1b forms the exterior of the image acquiring apparatus 1, and may protect key components of the image acquiring apparatus 1, as will be described below.

A flatbed 1e made of a transparent material may be arranged on the top of the main body 1b to allow the image acquiring apparatus 1 to acquire an image formed on the surface of the document D, and an image sensor module 110 or 120 may be arranged below the transparent flatbed 1e to obtain the image formed on the surface of the document D.

The flatbed cover 1a may include an Automatic Document Feeder (ADF) to automatically feed the document D. The image sensor module 110 or 120 may be located on one side of a feed path (FP) along which the document D is fed inside the flatbed cover 1a.

Furthermore, the flatbed cover 1a may include an input tray 1c on which the document D is placed and an output tray 1d onto which the document D, from the surface of which an image has been acquired, is released.

Referring to FIG. 2, the image acquiring apparatus 1 may functionally include an image acquirer 101 for acquiring an image formed on the surface of the document D, a user interface 400 for receiving a use input from the user and indicating operational information of the image acquiring apparatus 1, a storage 500 for storing the image acquired by the image acquirer 101, an image processor 200 for analyzing and processing the image acquired by the image acquirer 101, and a controller 300 for controlling overall operation of the image acquiring apparatus 1.

The image acquirer 101 may include first and second image sensor modules 110 and 120 for capturing the image formed on the surface of the document D, a document feed module 130 for feeding the document D, and a sensor moving module 140 for moving the first image sensor module 110.

The first and second image sensor modules 110 and 120 may each capture an image formed on the document D. Furthermore, the image acquirer 101 may output image data that corresponds to the image acquired by the first and second image sensor modules 110 and 120 to the image processor 200.

The document D may typically have double sides, and only one side or both sides may have images formed thereon.

The first and second image sensor modules 110 and 120 may capture an image formed on one side of the document D and an image formed on the other side of the document D, respectively. In other words, the first and second image sensor modules 110 and 120 may capture images formed on different sides of the document D.

Hereinafter, one side of the document D from which the first image sensor module 110 captures an image will be called the "first side", and an image formed on the first side will be called an "image on the first side". The other side of the document D from which the second image sensor module 120 captures an image will be called the "second side".

However, the first and second image sensor modules 110 and 120 are not limited to obtaining images formed on the first and second sides of the document D, respectively. For example, if an image is formed on the first side of the document D, the first image sensor module 110 may capture the image on the first side, and even the second image sensor module 120 may capture the image on the first side that penetrates the document D and appears on the second side. In other words, since paper, film, cloth, etc., that makes up the document D may not completely cut off light, the second image sensor module 120 may receive light that has penetrated the document D.

Hereinafter, an image on the first side that the second image sensor module 120 captures on the second side will be called an "penetrated image of the first side".

The first and second image sensor modules 110 and 120 may each include a light transmitter that emits light to the document D and a light receiver that receives light reflected from the document D.

For example, the light transmitter may include a plurality of photo diodes for emitting light to the surface of the document D, and the light receiver may include a plurality of photo detectors for measuring intensity of light reflected off the surface of the document D from the image formed on the document D. Especially, the light receiver may include mono photo detectors for measuring intensity of light, and color photo detectors for measuring intensity of light of a particular wavelength.

An image formed on the surface of the document D is commonly a two dimensional (2D) image. To obtain such a 2D image, the plurality of photo detectors may be arrayed in 2D. Alternatively, the plurality of photo detectors may be arrayed in a line, obtaining the 2D image formed on the document D by moving themselves or by moving the document D.

It is assumed herein that the plurality of photo detectors included in each of the first and second image sensor modules 110 and 120 are arrayed in a line, obtaining the 2D image of the document D by moving the first and second image sensor modules 110 and 120 or by moving the document D.

The plurality of photo detectors arrayed in a line to obtain a line image are typically referred to as a linear image sensor. In other words, the first and second image sensor modules 110 and 120 may each include a linear image sensor.

Since the first and second image sensor modules 110 and 120 each include a linear image sensors, the image acquirer 101 may include a document feed module 130 for feeding the document D and a sensor moving module 140 for moving the first image sensor module 110, in order to obtain a 2D image of the document D. Features and functions of the document feed module 130 and sensor moving module 140 will be described below in detail.

To obtain respective images formed on different sides of the document D, the first and second image sensor modules 120 may be arranged opposite to each other with respect to a feed path (FP) of the document D.

For example, as shown in FIG. 3, the first image sensor module 110 may be arranged on the outer side of the feed path FP along which the document D is fed, while the second image sensor module 120 may be arranged on the inner side of the feed path FP. As a result, while the document D is being fed, the first image sensor module 110 may capture an image on the first side of the document D or a penetrated image of the second side, and the second image sensor module 120 may capture an image on the second side or a penetrated image of the first side.

Furthermore, the second image sensor module 120 may be situated at a higher reach than the first image sensor module 110 is with respect to a feed direction FD in which the document D is fed. As a result, the second image sensor module 120 may first capture the image on the second side of the document D or the penetrated image of the first side, and the first image sensor module 110 may then capture the image on the first side of the document D or the penetrated image of the second side.

However, arrangement of the first and second image sensor modules 110 and 120 is not limited to what is shown in FIG. 3.

For example, as shown in FIG. 4, the first image sensor module 110 may be situated at a higher reach than the second image sensor module 120 is with respect to the feed direction FD in which the document D is fed. As a result, the first image sensor module 110 may first capture the image on the first side of the document D or the penetrated image of the second side, and the second image sensor module 112 may then capture the image on the second side of the document D or the penetrated image of the first side.

The document feed module 130 may feed the document D put on the input tray 1c to the output tray 1d along the feed path FP. As the document D is fed by the document feed module 130, the first and second image sensor modules 120 may capture a 2D image of the document D.

The document feed module 130 may include a plurality of feed rollers 131 for rolling the document D and feed motors (not shown) for turning the feed roller 131. In other words, rotation of the feed motor turns the feed roller 131, which in turn feeds the document D along the feed path FP.

Speed of the rotation of the feed motor may be controlled by the controller 300 as will be described below, and a feed speed of the document D may vary depending on the rotation speed of the feed motor. In other words, the feed speed of the document D may be controlled by the controller 300.

Furthermore, the resolution of images to be obtained by the first and second image sensor modules 110 and 120 may vary depending on the feed speed of the document D. For example, as the feed speed of the document D becomes faster, the resolution of images obtained by the first and second image sensor modules 110 and 120 becomes lower; as the feed speed of the document D becomes slower, the resolution of images obtained by the first and second image sensor modules 110 and 120 becomes higher.

The sensor moving module 140 may move the first image sensor module 110 to obtain the 2D image on the document D. For example, if the document D is put on the flatbed 1e shown in FIG. 1, the document D remains stationary, so the first image sensor module 110 needs to be moved to obtain the 2D image on the document D. In this regard, the sensor moving module 140 may move the first image sensor module 110.

The sensor moving module 140 may include a guide bar 141 for guiding movement of the first image sensor module 110, and a moving motor (not shown) for moving the first image sensor module 110 along the guide bar 141. For example, as shown in FIG. 1, if the linear image sensors of the first image sensor module 110 is arranged along the x-axis, the moving motor may move the first image sensor module 110 along the y-axis.

Rotation speed of the moving motor may be controlled by the controller 300 as will be described below, and the moving speed of the first image sensor module 110 may vary depending on the rotation speed of the moving motor. In other words, the moving speed of the first image sensor module 110 may be controlled by the controller 300.

Furthermore, the resolution of an image to be obtained by the first image sensor module 110 may vary depending on the moving speed of the first image sensor module 110. For example, as the moving speed of the first image sensor module 110 becomes faster, the resolution of an image to be obtained by the first image sensor module 110 becomes lower; as the moving speed of the first image sensor module 110 becomes slower, the resolution of an image to be obtained by the first image sensor module 110 becomes higher.

The user interface 400 may interact with the user. For example, the user interface 400 may receive a user input from the user and indicate operation information of the image acquiring apparatus 1.

The user interface 400 may receive color scan settings for the image acquiring apparatus 1 to acquire an image formed on the document D as a color image in colors, mono scan settings for the image acquiring apparatus 1 to acquire an image formed on the document D as a black and white (or monochrome) image, and automatic scan settings for the image acquiring apparatus 1 to acquire an image formed on the document D as a black and with image or a color image depending on whether the image on the document D is a monochrome image or a color image.

Furthermore, the user interface 400 may receive a resolution from the user for the image acquiring apparatus 1 to apply the resolution in acquiring an image formed on the document D.

The controller 300, which will be described below, may set an image acquisition type (mono or color) and image acquisition resolution for the image acquirer 101 based on the user input received through the user interface 400.

Specifically, the controller 300 may activate mono photo detectors or color photo detectors of the first and second image sensor modules 110 and 120 depending on the image acquisition type (mono or color). Furthermore, the controller 300 may control line times of the first and second image sensor modules 110 and 120 depending on the image acquisition type (mono or color). The line time refers to a time for the image sensor module 110, 120, which corresponds to a linear image sensor, to acquire a single line image, and there may be color image line times to acquire color images and mono image line times to acquire mono images.

The controller 300 may also control the document feed speed or sensor moving speed according to the image acquisition resolution.

The user interface 400 may include a plurality of buttons 410 to receive predetermined user inputs from the user, and a display 420 for displaying operation information of the image acquiring apparatus 1.

When pressed by the user, the plurality of buttons 410 may output a user instruction predefined for each button. The plurality of buttons 410 may include a numeric keypad for receiving predetermined numerical numbers, and an operation button to initiate or stop image acquisition operation of the image acquiring apparatus 1.

The display 420 may display the operation information of the image acquiring apparatus 1 in a visual manner. The display 420 may include a Liquid Crystal Display (LCD) panel, Light Emitting Diode (LED) panel, or the like, which converts electric signals to optical signals.

The display 420 may also include a touch screen to receive touch inputs of the user. For example, the touch screen may receive at least one touch or consecutive touches through a body part (e.g., a finger) of the user or touchable input means (e.g., a stylus pen), and convert the touch input of the user to a corresponding digital signal (e.g., in the xy coordinates) and output the digital signal to the controller 300. The touch screen may also display information corresponding to the touch input of the user.

The storage 500 may store a control program and control data for controlling the image acquiring apparatus 1, and various application programs and application data for performing various functions according to the user input.

For example, the storage 500 may store an Operating System (OS) program that manages features and resources (in software and hardware) included in the image acquiring apparatus 1, an image reproduction program that reproduces an image of the document D, an image editing program that edits the image of the document D, and a browser that accesses a Wide Area Network (WAN), such as the Internet.

The storage 500 may include a non-volatile memory that preserves the stored program or data even if the power is out. For example, the storage 500 may include a magnetic disc drive 510 or a semiconductor drive 520.

The image processor 200 may analyze or process the image acquired by the image acquirer 101.

For example, the image processor 200 may analyze the image acquired by the image acquirer 101, and determine whether the acquired image is text or pictures. The image processor 200 may also analyze the image acquired by the image acquirer 101, and determine whether the acquired image is a monochrome image e.g., only in white, black, and gray, or a color image e.g., in multiple colors.

Furthermore, the image processor 200 may perform sharpening or blurring on the image acquired by the image acquirer 101.

For example, for the blurring process, the image processor 200 may have the image pass through a low pass filter or a Gaussian filter.

For the sharpening process, the image processor 200 may have the image pass through the high pass filter. Also, for the sharpening process, the image processor 200 may detect edges of the image and combine the original image and the edge image.

The image processor 200 may include a graphic processor 210 for performing operation to process the image acquired by the image acquirer 101, and a graphic memory 220 for storing a program or data related to computational operation of the graphic processor 210.

The graphic memory 220 may include volatile memories, such as Static Random Access Memories (S-RAMs), Dynamic RAMs (D-RAMs), or the like, and non-volatile memories, such as Read Only Memories (ROMs), Erasable Programmable ROMs (EPROMs), Electrically Erasable Programmable ROMs (EEPROMs), flash memories or the like.

The volatile memory, a memory that loses stored data when the power is out, may temporarily store a program and data. For example, the volatile memory may temporarily store computational results of the graphic processor 210.

The non-volatile memory, a memory that preserves stored data even when the power is out, may semipermanently store a program and data. For example, the non-volatile memory may store a program and data for controlling computational operation of the graphic processor 210.

The graphic processor 210 may include an arithmetic and logic unit (ALU) for performing computations, and a memory circuit for storing data for computation or computed data.

The graphic processor 210 may perform operation to analyze and process the image acquired by the image acquirer 101.

The controller 300 may control operation of the aforementioned image acquirer 101, user interface 400, storage 500, and image processor 200.

For example, the controller 300 may activate mono photo detectors or color photo detectors included in the image acquirer 101 depending on the image acquisition type received through the user interface 400, and control line times. The controller 300 may also control the document feed speed or sensor moving speed according to the image acquisition resolution received through the user interface 400.

The controller 300 may also activate the mono photo detectors or color photo detectors included in the image acquirer 101 depending on whether the image acquired by the image acquirer 101 is a monochrome image or a color image, and control line times. The controller 300 may also control the document feed speed or sensor moving speed depending on whether the image acquired by the image acquirer 101 is text or pictures.

Furthermore, the controller 300 may control the image processor 200 to perform sharpening or blurring on the image depending on whether the image acquired by the image acquirer 101 is text or pictures.

The controller 300 may include a control processor 310 for performing operation to control operation of the image acquiring apparatus 1, and a control memory 320 for storing a program and data related to computational operation of the control processor 310.

The control memory 320 may include volatile memories, such as Static Random Access Memories (S-RAMs), Dynamic RAMs (D-RAMs), or the like, and non-volatile memories, such as Read Only Memories (ROMs), Erasable Programmable ROMs (EPROMs), Electrically Erasable Programmable ROMs (EEPROMs), flash memories or the like.

The volatile memory, a memory that loses stored data when the power is out, may temporarily store a program and data. For example, the volatile memory may temporarily store control instructions of the control processor 310.

The non-volatile memory, a memory that preserves stored data even when the power is out, may semipermanently store a program and data. For example, the non-volatile memory may store a program and data for the graphic processor 210 to perform control operation.

The control processor 310 may include an ALU for performing computation, and a memory circuit for storing data for computation or computed data.

The control processor 310 may perform arithmetic and logic operation for controlling operation of the image acquiring apparatus 1, and output control instructions resulting from the operation.

An embodiment of the features of the image acquiring apparatus 1 was described above.

Operation of the image acquiring apparatus 1 in the embodiment will now be described.

Figure 5:
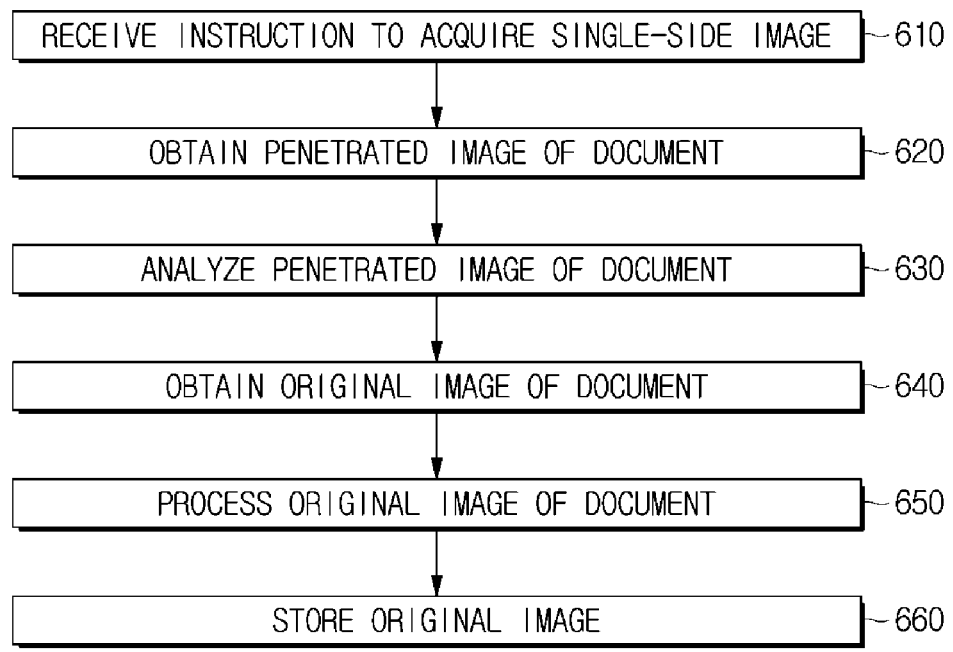
FIG. 5 is a flowchart illustrating an image acquiring method carried out by an image acquiring apparatus, according to an embodiment of the present disclosure.
Figure 6:
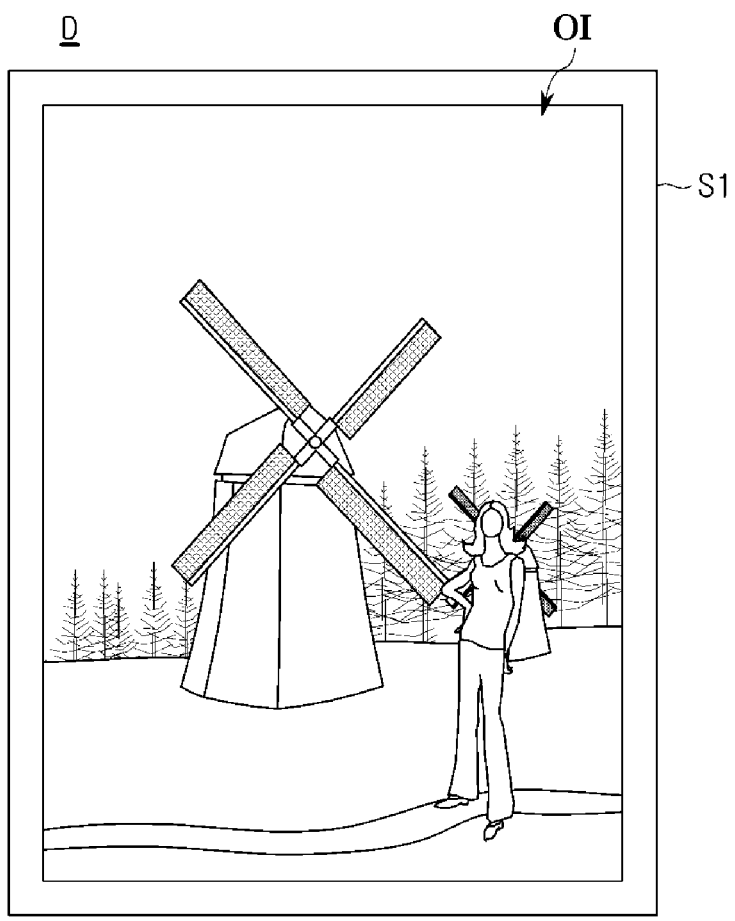
FIG. 6 illustrates an image formed on a document.
Figure 7:
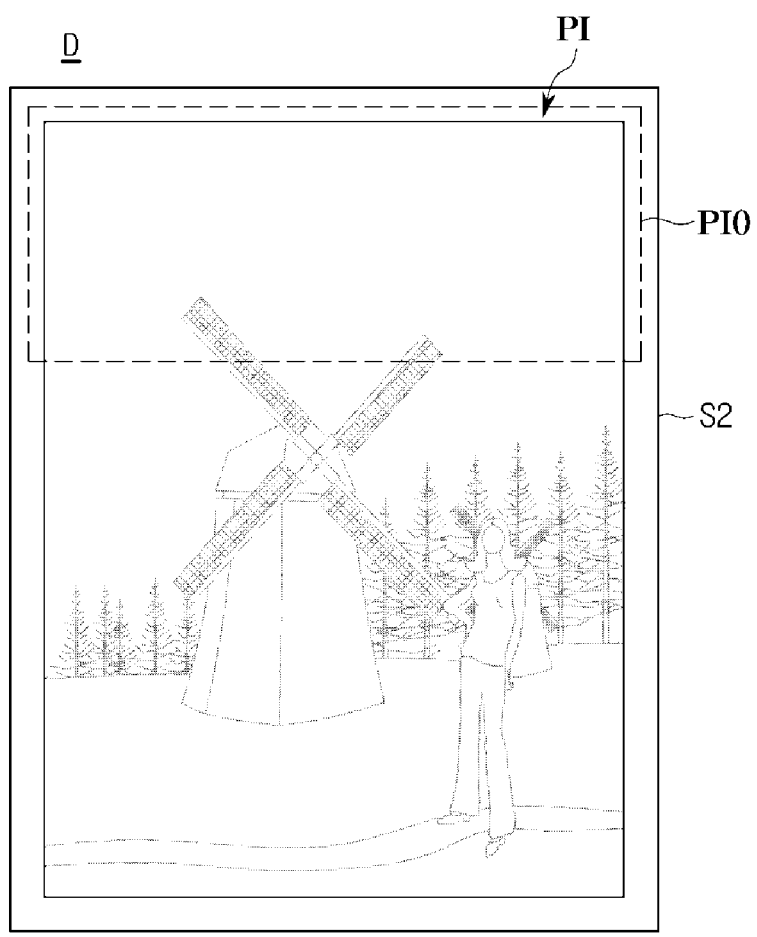
FIG. 7 illustrates a penetrated image obtained by the image acquiring method shown in FIG. 5.

FIG. 5 is a flowchart illustrating an image acquiring method carried out by an image acquiring apparatus, according to an embodiment of the present disclosure. FIG. 6 illustrates an image formed on a document, and FIG. 7 illustrates a penetrated image obtained by the image acquiring method shown in FIG. 5.

An image acquiring method 600 of the image acquiring apparatus 1 is described in connection with FIGS. 5, 6, and 7.

The image acquiring apparatus 1 receives an instruction from the user to acquire an image on a single side of the document D, in operation 610.

The image acquiring apparatus 1 may receive the user input through the user interface 400. For example, the image acquiring apparatus 1 may receive image acquisition setting values, such as an image acquisition type (e.g., mono scan or color scan), image acquisition resolution, etc., as well as user instructions related to operation of the image acquiring apparatus 1, such as to initiate or stop image acquisition.

For example, the user may put the document D on the input tray 1c of the image acquiring apparatus 1 with a side having an image OI to be acquired facing upward, and input an instruction to initiate image acquisition through the user interface 400.

To help understand the present disclosure, it is assumed herein that an image is formed on the first side S1 of the document D.

The image acquiring apparatus 1 obtains a penetrated image PI of the document D, in operation 620.

Once the instruction to initiate image acquisition has been input through the user interface 400, the controller 300 may control the document feed module 130 to pick up the document D and feed the picked-up document D.

While the document D is being fed along the feed path FP, the image acquirer 101 may acquire the image on the first side S1 through the second side S2. In other words, the image acquirer 101 may acquire the penetrated image PI of the first side S1 from the second side S2.

For example, as described in connection with FIG. 3, if the second image sensor module 120 is situated at a higher reach than the first image sensor module 110 is with respect to the feed direction FD of the document D, the second image sensor module 120 may obtain the image of the document D earlier than the first image sensor module 110 does.

With the document D having the image OI formed on the first side S1, the second image sensor module 120, which is able to obtain an image on the second side S2 of the document D, may obtain a penetrated image of the first side S1 that is seen on the second side S2, i.e., the penetrated image PI of the first side S1.

For example, when the original image OI is formed on the first side S1 of the document D as shown in FIG. 6, the second image sensor module 120 may obtain the penetrated image P1 as shown in FIG. 7.

Comparing FIGS. 6 and 7, the penetrated image PI has more blurred parts and lower contrast ratio than the original image OI. This is because the penetrated image PI is obtained by means of the light that has penetrated the document D.

After obtaining the penetrated image PI of the first side S1, the image acquirer 101 may output image data of the penetrated image PI to the image processor 200.

The image acquiring apparatus 1 then analyzes the penetrated image PI of the document D, in operation 630.

The image processor 200 of the image acquiring apparatus 1 may receive the image data of the penetrated image PI from the image acquirer 101 and analyze the received image data of the penetrated image PI.

In this regard, the image processor 200 may receive part of the penetrated image PI from the image acquirer 101 and analyze the received part of the penetrated image PI.

While the image acquirer 101 is acquiring the penetrated image PI of the document D, the document feed module 130 keeps feeding the document D, allowing the image acquirer 101 to acquire the original image OI of the document D.

For example, as shown in FIG. 3, feeding of the document D may allow the second image sensor module 120 to obtain the penetrated image P1 of the first side S1 of the document D earlier than the first image sensor module 110 does. As the document D keeps being fed, the document D reaches the first image sensor module 110, which is then able to obtain the original image OI on the first side S1 of the document D. In other words, before the second image sensor module 120 obtains the entire penetrated image PI of the document D, the first image sensor module 110 may start obtaining the original image OI of the document D.

Since the image processor 200 processes the original image OI in real time based on a result of analyzing the penetrated image PI of the document D once the image acquirer 101 has obtained the original image OI of the document D, the image processor 200 may analyze the received penetrated image PI until receiving the original image OI of the document 200.

For example, the image processor 200 may analyze the penetrated image PI based on part (PIO) of the penetrated image PI as shown in FIG. 7.

The size of the partial penetrated image PIO to be analyzed by the image processor 200 may be determined based on a distance between the first and second image sensor modules 110 and 120. Specifically, the longer the distance between the first and second image sensor modules 110 and 120, the larger the size of the penetrated image PIO to be analyzed by the image processor 200; the shorter the distance between the first and second image sensor modules 110 and 120, the smaller the size of the penetrated image PIO to be analyzed by the image processor 200.

Furthermore, the image processor 200 may determine whether the image of the document D is a text image or a picture image or whether the image of the document D is a monochrome image or a color image, based on analysis of the penetrated image PI.

For example, the image processor 200 may determine whether the document D is a text image or a picture image using a character area extraction algorithm, e.g., a morphology operation algorithm.

Specifically, when dilation operation and erosion operation are performed on the penetrated image PI, characters, symbols, and the like are deleted. According to a difference between an image in which characters, symbols, and the like have been deleted and the penetrated image PI, pictures are deleted, leaving characters, symbols, or the like.

In this way, the image processor 200 may determine whether the image of the document D is a text image or a picture image.

The image processor 200 may also determine whether the image of the document D is a monochrome image or a color image based on a result of analyzing color information of the penetrated image PI received from the image acquirer 101.

The image processor 200 may provide the result of analyzing the penetrated image PI to the controller 300.

The image acquiring apparatus 101 acquires the original image OI of the document D, in operation 640.

As described above, the document D fed by the document feed device 130 reaches the first image sensor module 110, which is then able to obtain the original image OI formed on the first side S1 of the document D.

Before the first image sensor module 110 obtains the original image OI of the document D, the controller 300 may change settings about acquiring the original image OI depending on the result of analyzing the transmitted image PI.

For example, when the penetrated image PI is a color image, the controller 300 may activate color photo detectors included in the first image sensor module 110 to obtain the color image effectively. When the penetrated image PI is a monochrome image, the controller 300 may activate mono photo detectors included in the first image sensor module 110 to obtain the monochrome image effectively.

Again, when the penetrated image PI is a color image, the controller 300 may set the line time of the first image sensor module 110 to a color image line time; when the penetrated image PI is a monochrome image, the controller 300 may set the line time of the first image sensor module 110 to a mono image line time. The line time as herein used refers to a time for the first image sensor module 110 to obtain a single line image, and the mono image line time may be shorter than the color image line time.

Furthermore, if the penetrated image PI includes a picture, the controller 300 may slower the document D feed speed to acquire the picture effectively. As a result, the resolution of the original image OI acquired by the image acquirer 101 increases. If the penetrated image PI includes characters only without any picture, the controller 300 may increase the document D feed speed to reduce image acquisition time. As a result, the image acquiring apparatus 1 may quickly acquire the original image OI at a moderate resolution.

Once setting values about image acquisition has changed, the first image sensor module 110 may obtain the original image OI formed on the first side S1 of the document D based on the changed setting values. Furthermore, the image acquirer 101 may provide image data that corresponds to the original image OI obtained by the first image sensor modules 110 to the image processor 200.

The image acquirer 101 processes the original image OI of the document D, in operation 650.

The image processor 200 of the image acquiring apparatus 1 may process the original image OI received from the image acquirer 101 in real time, make the image viewed more clearly to the user.

Specifically, the image processor 200 may process the image data of the original image OI as soon as the image data is received from the image acquirer 101. Since the first image sensor module 110 of the image acquirer 101 uses the linear image sensor to obtain the original image OI of the document D, the image acquirer 101 may transmit a part of the original image OI, i.e., one line image or two or more line images that make up the original image OI to the image processor 200. Upon reception of the one line or two or more line images, the image processor 200 may immediately process the one line or two or more line images.

In this regard, the image processor 200 may process the original image OI differently depending on the result of analyzing the penetrated image PI.

For example, if the result of analyzing the penetrated image PI reveals that the original image OI includes characters or symbols only, the image processor 200 may perform a sharpening process to increase sharpness of the image in order for the user to easily recognize the characters or symbols.

If the result of analyzing the penetrated image PI reveals that the original image OI includes pictures only, the image processor 200 may perform image processing to add a blurring effect to the image in order for the picture to be naturally recognizable to the user.

Furthermore, if the result of analyzing the penetrated image PI reveals that the original image OI includes both characters and pictures, the image processor 200 may perform a sharpening process to increase sharpness of the image in the area of the characters while performing a blurring process on the area of the pictures to make the pictures natural.

The image acquiring apparatus 1 then stores the processed original image OI, in operation 660.

After completion of acquisition and process of the original image OI, the controller 300 may store image data of the processed original image OI in the storage 500. Moreover, even before completion of acquisition and process of the original image OI, the controller 300 may store image data that has already been processed in the storage 500.

Furthermore, the controller 300 may store the original image OI in the storage 500 in various formats. For example, the controller 300 may store the original image OI in a bitmap format, an international standard image compression format, or an international standard electronic document format.

As described above, to acquire an image on one side of the document D, the image acquiring apparatus 100 may acquire and analyze the penetrated image P1 of the document D through the other side on which the original image OI is not formed, and depending on the analysis result, may change setting values about acquisition of the original image OI or change processing of the original image OI.

As a result, the image acquiring apparatus 100 may quickly acquire a clearer and more natural image.

Figure 8:
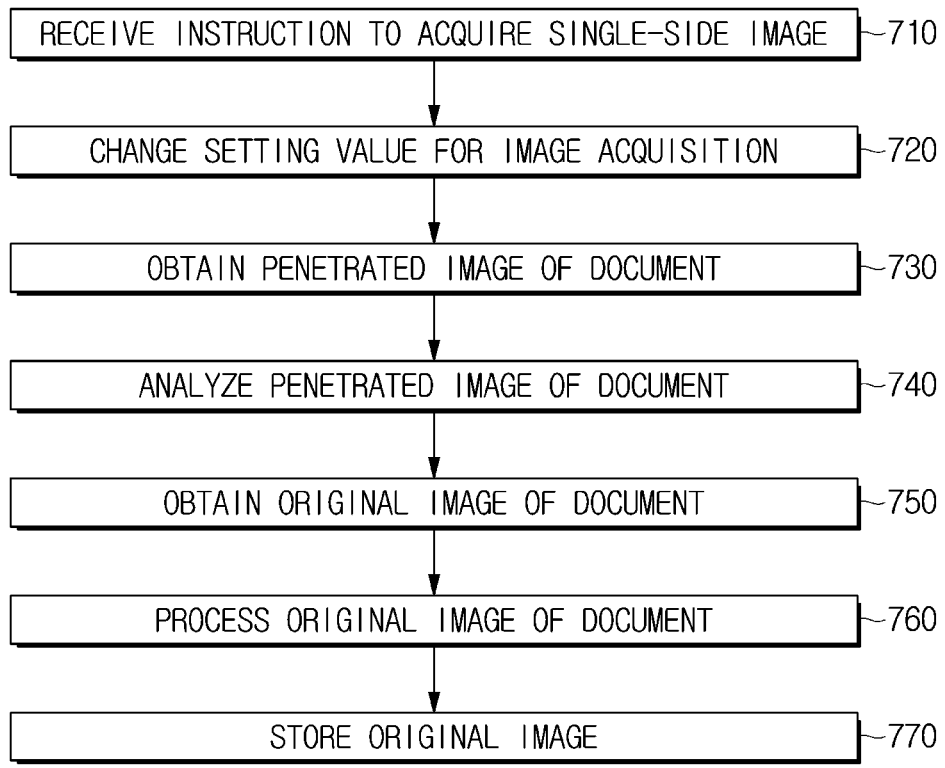
FIG. 8 is a flowchart illustrating an image acquiring method carried out by an image acquiring apparatus, according to another embodiment of the present disclosure.
Figure 9A:
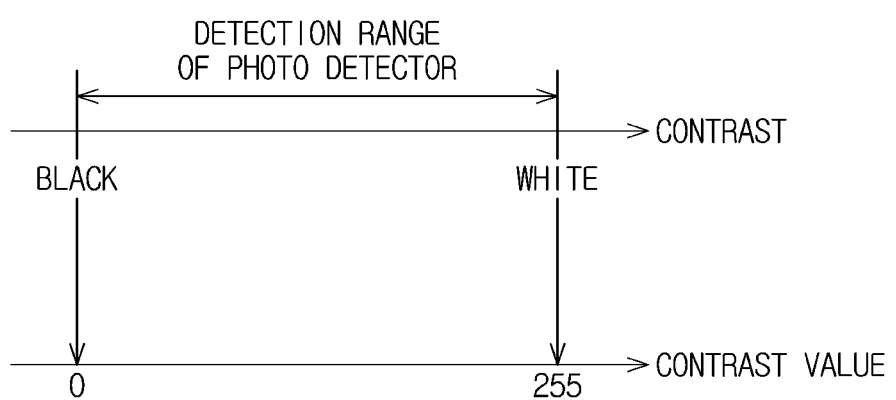
FIGS. 9A and 9B illustrate changing back shading offsets according to the image acquiring method shown in FIG. 8.
Figure 9B:
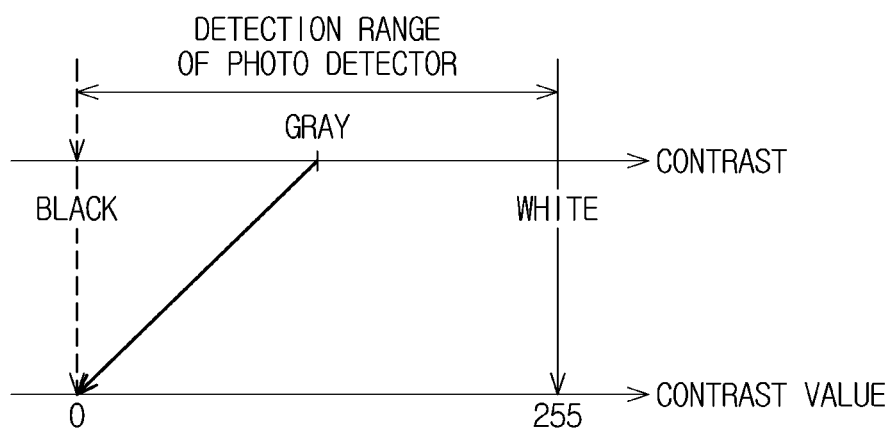
Figure 10A:
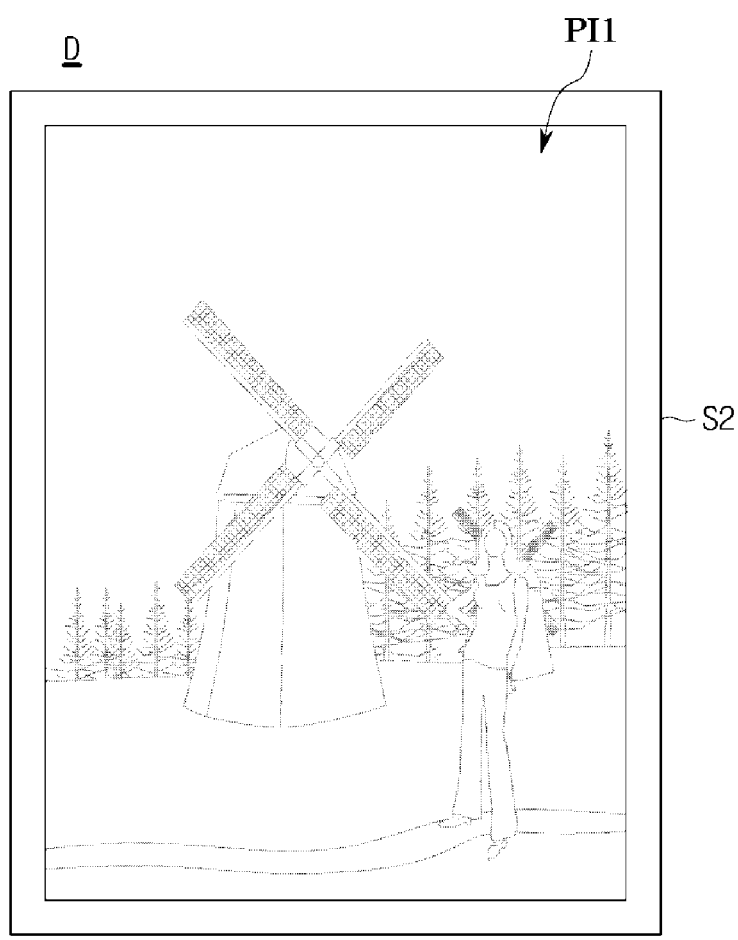
FIGS. 10A and 10B illustrate a conventional penetrated image and histogram.
Figure 10B:
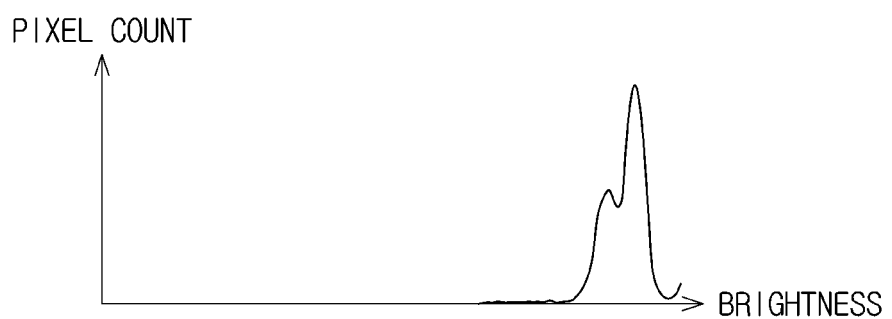
Figure 11A:
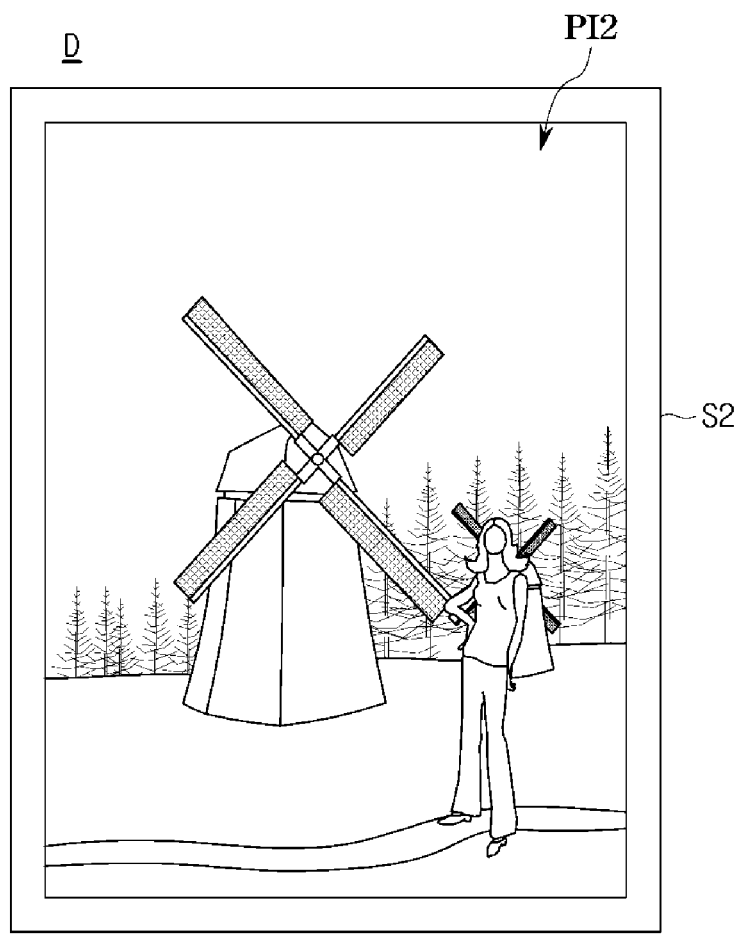
FIGS. 11A and 11B illustrate a penetrated image and histogram obtained by changing a black shading offset.
Figure 11B:
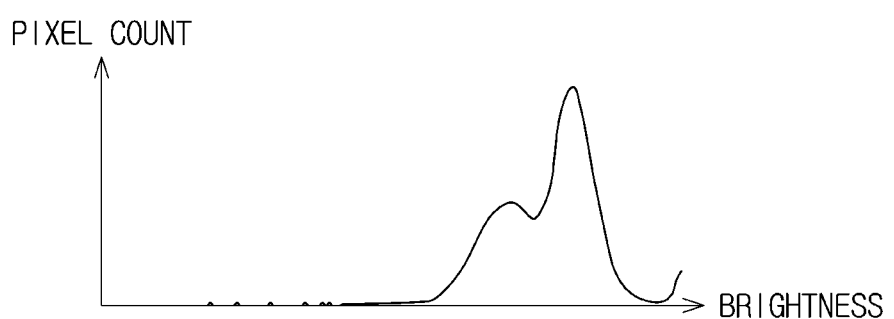
Figure 12A:
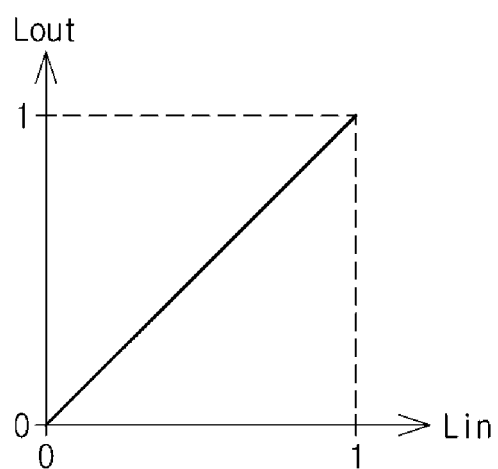
FIGS. 12A, 12B, and 12C illustrate changing gamma values according to the image acquiring method shown in FIG. 8.
Figure 12B:
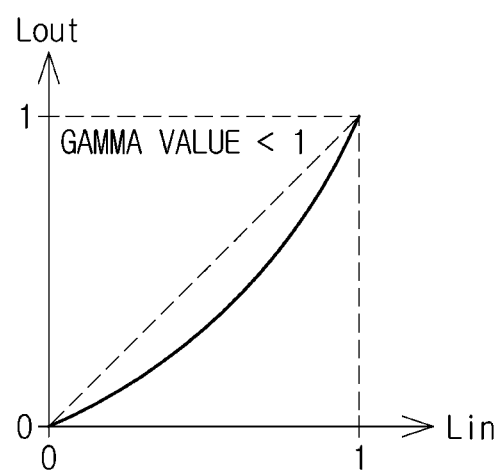
Figure 12C:
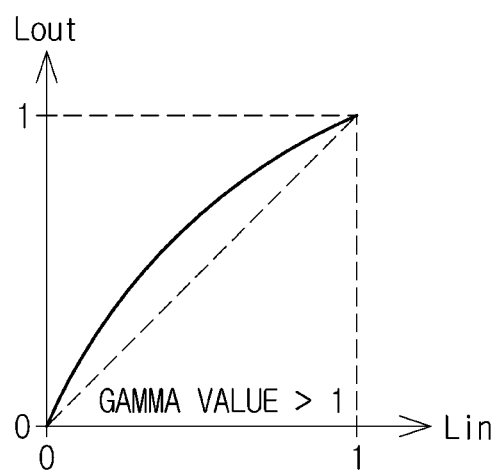

FIG. 8 is a flowchart illustrating an image acquiring method carried out by an image acquiring apparatus, according to another embodiment of the present disclosure. FIGS. 9A and 9B illustrate changing back shading offsets according to the image acquiring method shown in FIG. 8, FIGS. 10A and 10B illustrate a conventional penetrated image and histogram, FIGS. 11A and 11B illustrate a penetrated image and histogram obtained by changing black shading offsets, and FIGS. 12A, 12B, and 12C illustrate changing gamma values according to the image acquiring method shown in FIG. 8.

An image acquiring method 700 of the image acquiring apparatus 1 is described in connection with FIGS. 8 to 12C.

The image acquiring apparatus 1 receives an instruction from the user to acquire an image on a single side of the document D, in operation 710.

For example, the user may put the document D on the input tray 1c of the image acquiring apparatus 1 with a side having an image OI to be acquired facing upward, and input an instruction to initiate image acquisition through the user interface 400.

To help understand the present disclosure, it is assumed herein that an image is formed on the first side S1 of the document D.

The image acquiring apparatus 1 changes setting values for image acquisition, in operation 720.

To obtain clearer penetrated image P1, the controller 300 of the image acquiring apparatus 1 may change setting values of the first or second sensor module 110 or 120.

As shown in FIG. 3, when the second image sensor module 120 obtains the image on the first side S1 that is seen on the second side S2, i.e., the penetrated image PI of the first side S1, the controller 300 may change setting values about image acquisition of the second image sensor module 120.

For example, the controller 300 may change an offset for shading correction of the second image sensor module 120.

As described above, the first and second image sensor modules 110, 120 each include a linear image sensor having a plurality of photo detectors arrayed in a line.

The plurality of photo detectors may have optical properties, which are a little different from one another. For example, even if the plurality of photo detectors detect the same light, they each may output a signal at a different level.

To compensate for the different optical properties of the respective photo detectors that constitute the first and second image sensor modules 110, 120, the image acquirer 101 may perform shading correction.

Specifically, to compensate for the different optical properties of the plurality of photo detectors, there may be black shading offsets to compensate for minimum values of outputs of the photo detectors (outputs corresponding to a black image) and white shading offsets to compensate for maximum values of outputs of the photo detectors (outputs corresponding to a white image).

The image acquirer 101 may use the black shading offsets and whit shading offsets to compensate the outputs of the plurality of photo detectors, to make the outputs of the plurality of photo detectors even.

Specifically, the image acquirer 101 may change the black shading offsets for the second image sensor module 120 to acquire a clear penetrated image PI.

The penetrated image PI has an increased contrast value as compared to the original image, due to the color (white) of the document D. To decrease the contrast value, the image acquirer 101 may increase the black shading offset for the second image sensor module 120.

As the black shading offset value for the second image sensor module 120 increases, the penetrated image acquired by the second image sensor module 120 becomes dark as a whole.

For example, if the black shading offset is "0", the black color, which is the darkest in the detection range of a photo detector, is mapped to contrast value "0", and the white color, which is the brightest in the detection range of the photo detector, is mapped to contrast value "255", as shown in FIG. 9A.

On the other hand, if the black shading offset is "128", colors from black, which is the darkest in the detection range of a photo detector, to gray are mapped to contrast value "0", and the white color, which is the brightest in the detection range of the photo detector, is mapped to contrast value "255", as shown in FIG. 9B. In other words, if the black shading offset is "128", the image acquirer 101 may detect gray in the actual penetrated image as black.

As a result, with the black shading offset being "128", the image acquirer 101 may output a penetrated image that has been compensated to be darker than the actual penetrated image.

By compensating the penetrated image to be darker, the image acquirer 101 may acquire the penetrated image, which is clearer than the actual penetrated image.

For example, in a case that the second image sensor module 120 obtains a first penetrated image PI1 as shown in FIG. 10A, the brightness histogram of the penetrated image PI1 is shown as in FIG. 10B. Referring to FIG. 10B, the first penetrated image PI1 has many pixels that have high contrast values due to the color (white) of the document D itself. In other words, a high contrast area includes many pieces of image information.

A second penetrated image PI2 obtained by the second image sensor module 120 with the increased black shading offset is shown as in FIG. 11A. Referring to FIG. 11A, it is seen that the second penetrated image PI2 looks even clearer than the first penetrated image PI1 shown in FIG. 10A.

A histogram of the second penetrated image PI2 obtained by the second image sensor module 120 with the increased black shading offset is shown as in FIG. 11B. Referring to FIG. 11B, it is seen that the second penetrated image PI2 has decreased contrast values as compared to the histogram of the first penetrated image PI1.

In another example, the controller 300 may change a gamma value for the second image sensor module 120.

While a gamma value, in the display field, represents a relationship between brightness of image data input to a display device and brightness of an image displayed by the display device, a gamma value, in the image acquisition field, represents a relationship between contrast (or brightness) detected by an image sensor and contrast (or brightness) stored in image data that corresponds to an image. In other words, even for the same image, different image data may be stored depending on the gamma value of the image sensor.

The gamma value in the image acquisition field may be defined according to the following equation 1:

$$L_{out}=L_{in}^{1/\gamma} \quad (1)$$

where Lout denotes a ratio of output contrast to available maximum output contrast, Lin denotes a ratio of input contrast to available maximum input contrast, and γ denotes the gamma value.

For example, if the gamma value has "1", the image sensor may output image data having the same contrast value as in the actual image, as shown in FIG. 12A.

If the gamma value is less than "1", the image sensor may output image data with a dark part of the actual image shrunk and a bright part expanded, as shown in FIG. 12B.

If the gamma value is greater than "1", the image sensor may output image data with a dark part of the actual image expanded and a bright part shrunk, as shown in FIG. 12C.

Typically, the gamma value of an image sensor of an image acquiring apparatus is set to "2.2". An initial gamma value of the first and second image sensor modules 110 and 120 may also be set to "2.2".

At this time, the penetrated image has high contrast as a whole, due to the color (white) of the document D. That is, the penetrated image has more bright parts which include more image information.

Furthermore, as the gamma value of the image sensor decreases, the image sensor may obtain image data including more information of a bright area of the image, and the bright part of an image resulting from the acquired image data becomes clearer.

Accordingly, to make the penetrated image having more image information in the bright part clearer, the image acquirer 101 may decrease gamma values for the second image sensor modules 120. Preferably, the gamma value for the second image sensor module 120 may be set to a value less than '1'.

As described above, the image acquirer 101 may control the black shading offset or gamma value for the second image sensor module 120 to obtain an even clearer penetrated image.

The image acquiring apparatus 1 obtains a penetrated image PI of the document D, in operation 730.

While the document D is being fed along the feed path FP, the second image sensor module 1120 of the image acquirer 1100 may acquire the penetrated image P1 of the first side S1 through the second side S2.

The image acquiring apparatus 1 then analyzes the penetrated image PI of the document D, in operation 740.

The image processor 200 of the image acquiring apparatus 1 may receive the image data of the penetrated image PI from the image acquirer 101 and analyze the received image data of the penetrated image PI.

The image processor 200 may determine whether the image of the document D is a text image or a picture image or whether the image of the document D is a monochrome image or a color image, based on analysis of the penetrated image PI.

The image processor 200 may provide the result of analyzing the penetrated image PI to the controller 300.

The image acquiring apparatus 1 acquires an original image OI of the document D, in operation 750.

The document D fed by the document feed device 130 reaches the first image sensor module 110, which is then able to acquire the original image OI formed on the first side S1 of the document D.

Before the first image sensor module 110 acquires the original image OI of the document D, the controller 300 may change settings about acquiring the original image OI depending on the result of analyzing the penetrated image PI.

For example, the controller may control the image acquirer 101 to acquire a monochrome image or color image depending on whether the penetrated image PI is a monochrome image or color image, and control the image acquirer 101 to adjust the document feed speed or sensor moving speed depending on whether the penetrated image PI is a text image or a picture image.

The image acquiring apparatus 1 processes the original image OI of the document D, in operation 760.

The image processor 200 of the image acquiring apparatus 1 may process the original image OI received from the image acquirer 101 in real time, make the image viewed more clearly to the user.

In this regard, the image processor 200 may process the original image OI differently depending on the result of analyzing the penetrated image PI.

For example, if the result of analyzing the penetrated image PI reveals that the original image OI includes characters or symbols only, the image processor 200 may perform sharpening on the image, and if the result of analyzing the penetrated image PI reveals that the original image OI includes pictures only, the image processor 200 may perform blurring on the image.

The image acquiring apparatus 1 then stores the original image OI, in operation 770.

After completion of acquisition and process of the original image OI, the controller 300 may store image data of the processed original image OI in the storage 500. Especially, the controller 300 may store the original image OI in the storage 500 in various formats.

As described above, to acquire an image on one side of the document D, the image acquiring apparatus 1 may acquire and analyze the penetrated image PI of the document D through the other side on which the original image OI is not formed, and depending on the analysis result, may change setting values about acquisition of the original image OI or change processing of the original image OI.

To obtain clearer penetrated image PI, the image acquiring apparatus 1 may change black shading offsets or gamma values for the image sensor module to acquire the penetrated image PI.

Figure 13:
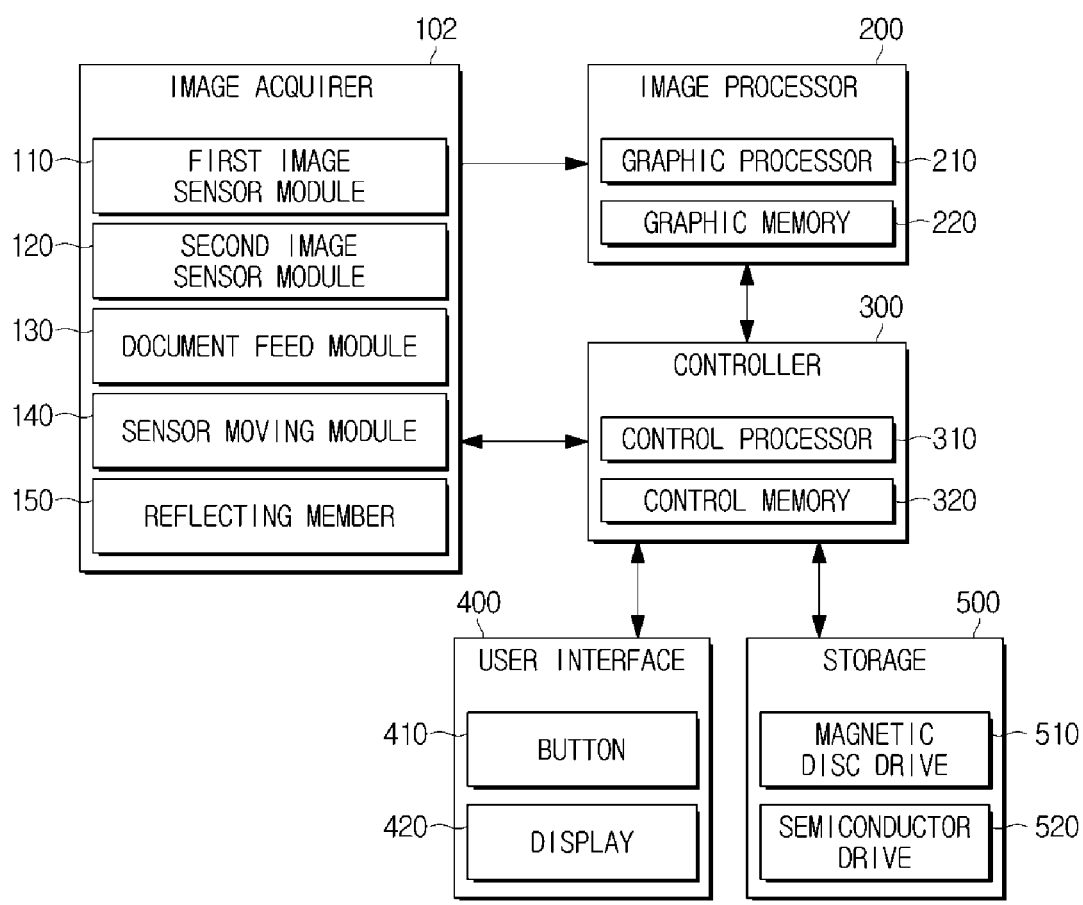
FIG. 13 is a block diagram of an image acquiring apparatus, according to another embodiment of the present disclosure.
Figure 14:
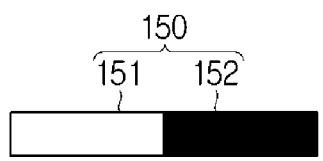
FIG. 14 illustrates a reflecting member included in an image acquiring apparatus, according to an embodiment of the present disclosure.
Figure 15:
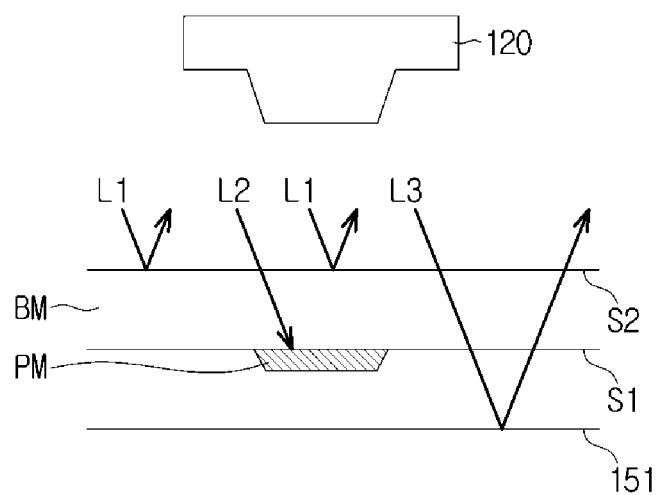
FIGS. 15 and 16 illustrate functionalities of a reflecting member included in an image acquiring apparatus, according to an embodiment of the present disclosure.
Figure 16:
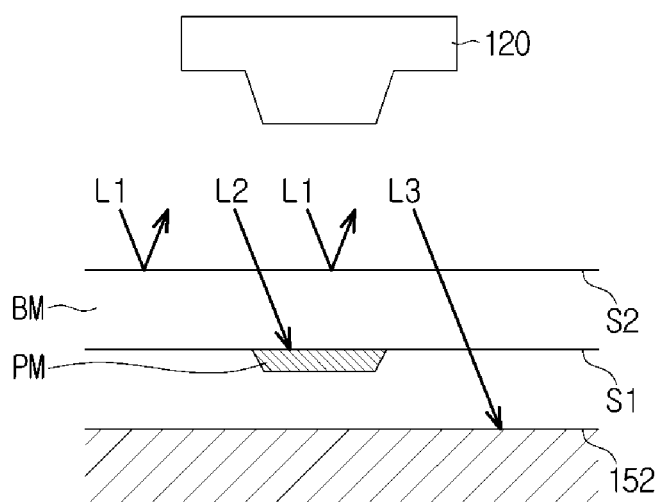
Figure 17:
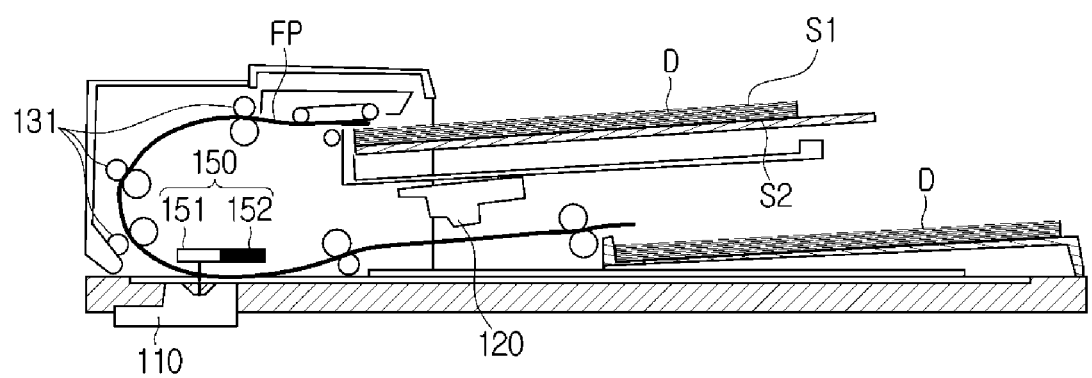
FIGS. 17 and 18 illustrate arrangement of a reflecting member included in an image acquiring apparatus, according to embodiments of the present disclosure.
Figure 18:
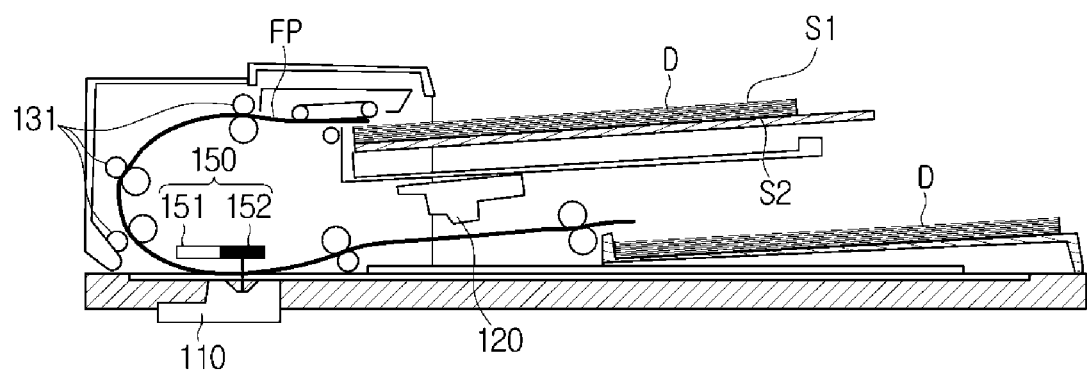

FIG. 13 is a block diagram of an image acquiring apparatus, according to another embodiment of the present disclosure. FIG. 14 illustrates a reflecting member included in an image acquiring apparatus, according to an embodiment of the present disclosure, and FIGS. 15 and 16 illustrate functionalities of a reflecting member included in an image acquiring apparatus, according to an embodiment of the present disclosure. FIGS. 17 and 18 illustrate arrangement of a reflecting member included in an image acquiring apparatus, according to embodiments of the present disclosure.

Referring to FIG. 13, an image acquiring apparatus 2 may include an image acquirer 102 for acquiring an image formed on the surface of the document D, an image processor 200 for analyzing and processing the image acquired by the image acquirer 102, a user interface 400 for receiving a use input from the user and indicating operational information of the image acquiring apparatus 2, a storage 500 for storing the image acquired by the image acquirer 102, and a controller 300 for controlling overall operation of the image acquiring apparatus 2.

The image acquirer 102 may include first and second image sensor modules 110 and 120 for capturing the image formed on the document D, a document feed module 130 for feeding the document D, a sensor moving module 140 for moving the first image sensor module 110, and a reflecting member 150 for enabling a clearer penetrated image to be obtained.

The first and second image sensor modules 110 and 120 may each capture an image formed on the document D. Furthermore, the image acquirer 102 may output image data that corresponds to the image acquired by the first and second image sensor modules 110 and 120 to the image processor 200. The first and second image sensor modules 110 and 120 may each include a linear image sensor.

Since the first and second image sensor modules 110 and 120 each include the linear image sensor, the image acquirer 102 may include a document feed module 130 for feeding the document D and a sensor moving module 140 for moving the first image sensor module 110, in order to obtain a 2D image of the document D.

The document feed module 130 may feed the document D put on the input tray 1c to the output tray 1d along the feed path FP, and the sensor moving module 140 may move the first image sensor module 110 to obtain the 2D image of the document D.

The reflecting member 150 may include first and second reflecting parts 151 and 152, as shown in FIG. 14, the first reflecting part 151 having a greater optical reflectivity than that of the second reflecting part 152.

For example, the first reflecting part 151 may reflect a majority of incident light, and the second reflecting part 152 may absorb a majority of incident light.

Specifically, the first reflecting part 151 may be made of a material having a higher optical reflectivity in order for the image acquirer 102 to acquire a clearer penetrated image.

The first and second image sensor modules 110 and 120 may each capture an image formed on the document D by receiving light reflected from the document D.

Specifically, the white part of an image has a higher optical reflectivity while the black part of the image has a lower optical reflectivity. Accordingly, the first and second image sensor modules 110 and 120 may distinguish the white part from the black part in the document D by measuring the intensity of light reflected from the surface of the document D. In other words, a part having high intensity of light reflected from the surface of the document D may be determined to be in white, and a part having low intensity of light reflected from the surface of the document D may be determined to be in black. Furthermore, the image acquirer 102 may acquire an image formed on the document D by a combination of the white and black parts.

Even in case of obtaining the penetrated image PI of the document D, the first and second image sensor modules 110 and 120 may obtain the penetrated image PI of the document D by measuring intensity of light reflected from the document D.

However, in acquiring the penetrated image PI of the document D, light may be reflected from the surface of the document D, or may be penetrated a base material BM e.g., paper, of the document D and absorbed into the image formed on the document D.

As a result, the penetrated image PI acquired through the second side S2 is less clear than the original image formed on the first side S1.

The first reflecting part 151 may make the penetrated image PI acquired by the first or second image sensor module 110 or 120 clear.

For example, as shown in FIG. 15, if the second image sensor module 120 obtains an image I formed on the first side S1 of the document D through the second side S2, light may travel in different paths (L1, L2, L3, L4).

Specifically, a majority of light L1 irradiated toward the document D is reflected off the second side S2 of the document D. As a result, the penetrated image PI of the document D appears brighter than the original image does.

Furthermore, some light L2, L3 among the light irradiated toward the document D may penetrate the base material BM e.g., paper, of the document D and reach the first side S1 of the document D.

Among the light L2, L3 that has penetrated the base material BM, e.g., paper, light L2 that has reached a pigment material PM, such as ink or toner applied on the first side S1 is absorbed in the pigment material PM.

Like this, light L2 that has reached the pigment material PM is not reflected, so the second image sensor module 120 may recognize an area with the pigment material applied thereon to be in black.

However, since the second side S2 corresponding to the first side S1 with the pigment material PM applied thereon reflects light, the second image sensor module 120 may recognize the area with the pigment material PM applied thereon not to be in pure black but to be in gray with white mixed, and thus the penetrated image PI is not clear as compared with the original image.

Moreover, among the light L2, L3 that has penetrated the base material BM, e.g., paper, of the document D, light L3 that has reached an area with no pigment material PM applied thereon, such as ink or toner may pass through the document D intact.

At this time, the first reflecting part 151 of the reflecting member 150 may reflect light L3 that has penetrated the document D. Like this, light L3 reflected off the first reflecting part 151 penetrates the document D again and is received by the second image sensor 120.

Since the light L1 reflected off the second side S2 and the light L3 reflected off the first reflecting part 151 are combined in the area on the first side S1, on which no pigment material PM is applied, the first reflecting part 151 makes intensity of light in the area with no pigment material PM applied stronger. As a result, the area with the pigment material PM applied may appear even darker.

Accordingly, the first reflecting part 151 may enable the penetrated image PI obtained by the second image sensor module 120 to be clearer.

Furthermore, the second reflecting part 152 may be made of a material having low optical reflectivity to prevent images formed on both sides of the document from interfering with each other in acquiring images on both sides.

As described above, the first and second image sensor modules 110 and 120 may each capture an image formed on the document D by measuring intensity of light reflected from the document D.

With images formed on both sides (first and second sides) of the document D, an image on the first side may cause interference with the second image sensor module 120 obtaining an image on the second side, and the image on the second side may cause interference with the first image sensor module 110 obtaining the image on the first side.

The second reflecting part 152 may minimize the interferences between the images on the first and second sides.

For example, as shown in FIG. 16, in the case the second image sensor module 120 obtains an image I formed on the first side S1 of the document D through the second side S2, light may travel in different paths (L1, L2, L3).

Specifically, a majority of light L1 irradiated toward the document D is reflected off the second side S2 of the document D.

Furthermore, some light L2, L3 among the light irradiated toward the document D may penetrate the base material BM e.g., paper, of the document D and reach the first side S1 of the document D.

Among the light L2, L3 that has penetrated the base material BM, e.g., paper, light L2 that has reached a pigment material PM, such as ink or toner applied on the first side S1 is absorbed in the pigment material PM.

Like this, light L2 that has reached the pigment material PM is not reflected off, so the second image sensor module 120 may recognize an area on which the pigment material is applied to be in black. As a result, during acquisition of the image on the second side S2, the image on the first side S1 may be acquired.

Moreover, among the light L2, L3 that has penetrated the base material BM, e.g., paper, of the document D, light L3 that has reached an area with no pigment material PM applied thereon, such as ink or toner may pass through the document D intact.

At this time, the second reflecting part 152 of the reflecting member 150 may absorb light L3 that has penetrated the document D.

As a result, light L2, L3 that has penetrated the base material BM, e.g., paper, of the document D may be absorbed in the second reflecting part 152 or in the pigment material PM, and the second image sensor module 120 may only receive the light reflected from the second side S2 of the document D but may not acquire the image formed on the first side S1 of the document D.

Accordingly, the second reflecting part 152 may enable interference of the image on the first side S1 to be reduced in acquiring the image on the second side S2 of the document D.

As described above, the reflecting member 150 may make the penetrated image clear in acquiring a single-side image, and reduce interferences between images on the first and second sides in acquiring double-side images.

Furthermore, the reflecting member 150 may be arranged near the first image sensor module 110 that may be movable by the sensor moving module 140, as shown in FIGS. 17 and 18. Preferably, the first image sensor module 110 may be arranged at an upper reach from the second image sensor module 120 with respect to the feed direction of the document D, in order for the first image sensor module 110 to obtain the penetrated image PI of the document D.

The first image sensor module 110 may be moved between the first and second reflecting parts 151 and 152 of the reflecting member 150 depending on whether a single-side image is to be acquired or double-side images are to be acquired.

Specifically, when the user enters an instruction to acquire a single-side image, the first image sensor module 110 may be moved to the first reflecting part 151 of the reflecting member 150, as shown in FIG. 17. As a result, the first image sensor module 110 may obtain a clear penetrated image PI of the document D with the help of the first reflecting part 151.

When the user enters an instruction to acquire double-side images, the first image sensor module 110 may be moved to the second reflecting part 152 of the reflecting member 150, as shown in FIG. 18. As a result, the first image sensor module 110 may obtain an image on the second side S2, which is not interfered by an image on the first side S1, with the help of the second reflecting part 152.

The reflecting member 150 is not limited to being shaped like a bar or plate. For example, the reflecting member 150 may be shaped like a cylinder or polyprism, in which the first and second reflecting parts 151 and 152 are alternately arranged along the outer face.

The user interface 400 may interact with the user. For example, the user interface 400 may receive color scan settings for the image acquiring apparatus 2 to acquire an image formed on the document D as a color image, mono scan settings for the image acquiring apparatus 2 to acquire an image formed on the document D as a black and white (or monochrome) image, and automatic scan settings for the image acquiring apparatus 2 to acquire an image formed on the document D as a black and white image or color image depending on whether the image on the document D is a monochrome image or a color image. Furthermore, the user interface 400 may receive a resolution from the user for the image acquiring apparatus 2 to apply the resolution in acquiring an image formed on the document D.

The user interface 400 may include a plurality of buttons 410 to receive predetermined user inputs from the user, and a display 420 for displaying operation information of the image acquiring apparatus 2.

The storage 500 may store a control program and control data for controlling the image acquiring apparatus 2, and various application programs and application data for performing various functions according to the user input.

The storage 500 may include a non-volatile memory that preserves the stored program or data even if the power is out. For example, the storage 500 may include a magnetic disc drive 510 or a semiconductor drive 520.

The image processor 200 may analyze or process an image acquired by the image acquirer 102.

For example, the image processor 200 may analyze an image acquired by the image acquirer 102, and determine whether the acquired image is text or pictures. The image processor 200 may analyze the image acquired by the image acquirer 102, and determine whether the acquired image is a monochrome image e.g., only in white, black, and gray, or a color image e.g., in multiple colors.

Furthermore, the image processor 200 may perform sharpening or blurring on the image acquired by the image acquirer 102.

The image processor 200 may include a graphic processor 210 for performing operation to process the image acquired by the image acquirer 102, and a graphic memory 220 for storing a program or data related to computational operation of the graphic processor 210.

The controller 300 may control operation of the aforementioned image acquirer 102, user interface 400, storage 500, and image processor 200.

For example, the controller 300 may control the sensor moving module 140 to move the first image sensor module 110 to the first or second reflecting part 151 or 152 of the reflecting member 150 depending on whether a singe-side image is to be acquired or double-side images are to be acquired.

For example, the controller 300 may control the image acquirer 102 to acquire a monochrome image or color image depending on the image acquisition type, and may control the image acquirer 102 to adjust the document feed speed or sensor moving speed depending on the image acquisition resolution.

Furthermore, the controller 300 may control the image processor 200 to perform sharpening or blurring on the image depending on whether the penetrated image PI is text or pictures.

The controller 300 may include a control processor 310 for performing operation to control operation of the image acquiring apparatus 2, and a control memory 320 for storing a program and data related to computational operation of the control processor 310.

Another embodiment of the features of the image acquiring apparatus 2 was described above.

Operation of the image acquiring apparatus 2 according to the embodiment will now be described.

Figure 19:
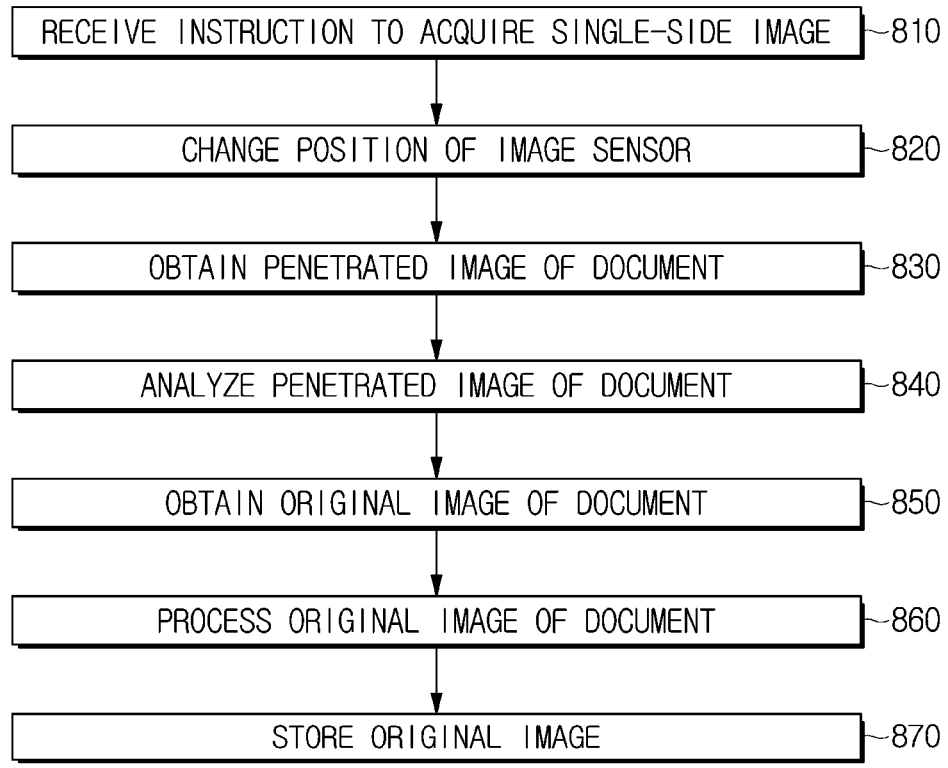
FIG. 19 is a flowchart illustrating an image acquiring method carried out by an image acquiring apparatus, according to another embodiment of the present disclosure.

FIG. 19 is a flowchart illustrating an image acquiring method carried out by an image acquiring apparatus, according to another embodiment of the present disclosure.

An image acquiring method 800 of the image acquiring apparatus 2 is described in connection with FIG. 19.

The image acquiring apparatus 2 receives an instruction from the user to acquire an image on a single side of the document D, in operation 810.

For example, the user may put the document D on the input tray 1c of the image acquiring apparatus 2 with a side having an image OI to be acquired facing upward, and input an instruction to initiate image acquisition through the user interface 400.

To help understand the present disclosure, it is assumed in the following description that an image is formed on the second side S2 of the document D.

The image acquiring apparatus 2 changes the position of the movable first image sensor module 110, in operation 820.

As described above in connection with FIG. 17, the controller 300 of the image acquiring apparatus 2 may control the sensor moving module 140 to move the first image sensor module 110 to the first reflecting part 151 of the reflecting member 150.

As a result, the first image sensor module 110 may obtain a clear penetrated image PI of the document D with the help of the first reflecting part 151 of the reflecting member 150.

The image acquiring apparatus 2 acquires the penetrated image PI of the document D, in operation 830.

While the document D is being fed along the feed path FP, the first image sensor module 110 of the image acquirer 102 may obtain the penetrated image PI of the second side S2 through the first side S1.

The image acquiring apparatus 2 then analyzes the penetrated image PI of the document D, in operation 840.

The image processor 200 of the image acquiring apparatus 2 may receive image data of the penetrated image PI from the image acquirer 102 and analyze the received image data of the penetrated image PI.

The image processor 200 may determine whether the image of the document D is a text image or a picture image or whether the image of the document D is a monochrome image or a color image, based on analysis of the penetrated image PI.

The image processor 200 may provide the result of analyzing the penetrated image PI to the controller 300.

The image acquiring apparatus 2 acquires an original image OI of the document D, in operation 850.

The document fed by the document feed device 130 reaches the second image sensor module 120, which is then able to obtain the original image OI formed on the second side S2 of the document D.

Before the second image sensor module 120 obtains the original image OI of the document D, the controller 300 may change settings about acquiring the original image OI depending on the result of analyzing the penetrated image PI.

For example, the controller 300 may control the image acquirer 102 to acquire a monochrome image or color image depending on whether the transmitted image PI is a monochrome image or color image, and control the image acquirer 102 to adjust the document feed speed or sensor moving speed depending on whether the transmitted image PI is a text image or a picture image.

The image acquiring apparatus 2 processes the original image OI of the document D, in operation 860.

The image processor 200 of the image acquiring apparatus 2 may process the original image OI received from the image acquirer 102 in real time, to make the image viewed more clearly to the user.

In this regard, the image processor 200 may process the original image OI differently depending on the result of analyzing the penetrated image PI.

For example, if the result of analyzing the penetrated image PI reveals that the original image OI includes characters or symbols only, the image processor 200 may perform sharpening on the image to increase sharpness of the image, and if the result of analyzing the penetrated image PI reveals that the original image OI includes pictures only, the image processor 200 may perform blurring on the image to make the pictures look natural.

The image acquiring apparatus 2 then stores the processed original image OI, in operation 870.

After completion of acquisition and process of the original image OI, the controller 300 may store image data of the processed original image OI in the storage 500. Especially, the controller 300 may store the original image OI in the storage 500 in various formats.

As described above, to acquire an image on one side of the document D, the image acquiring apparatus 2 may acquire and analyze the penetrated image PI of the document D through the other side on which the original image OI is not formed, and depending on the analysis result, may change setting values about acquisition of the original image OI or change processing of the original image OI.

The image acquiring apparatus 2 may further include the reflecting member 150 to acquire a clear penetrated image PI.

Figure 20:
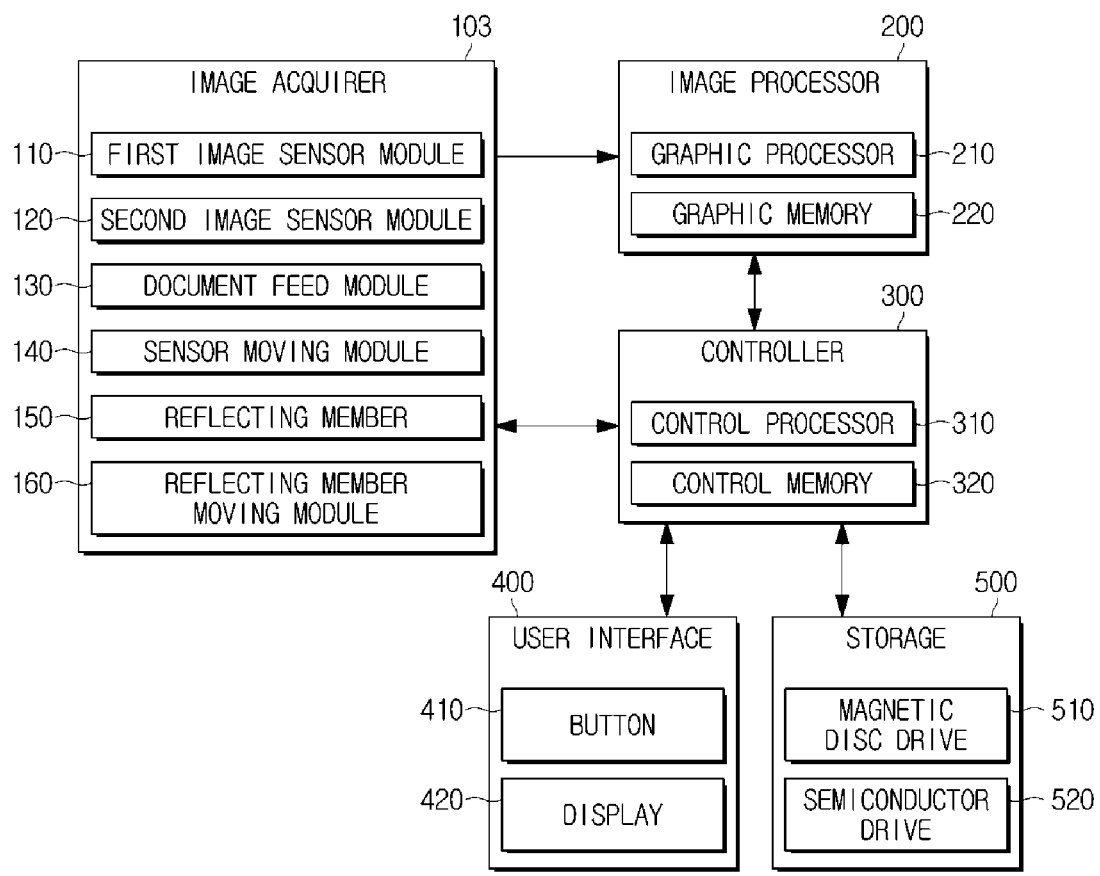
FIG. 20 is a block diagram of an image acquiring apparatus, according to another embodiment of the present disclosure.
Figure 21:
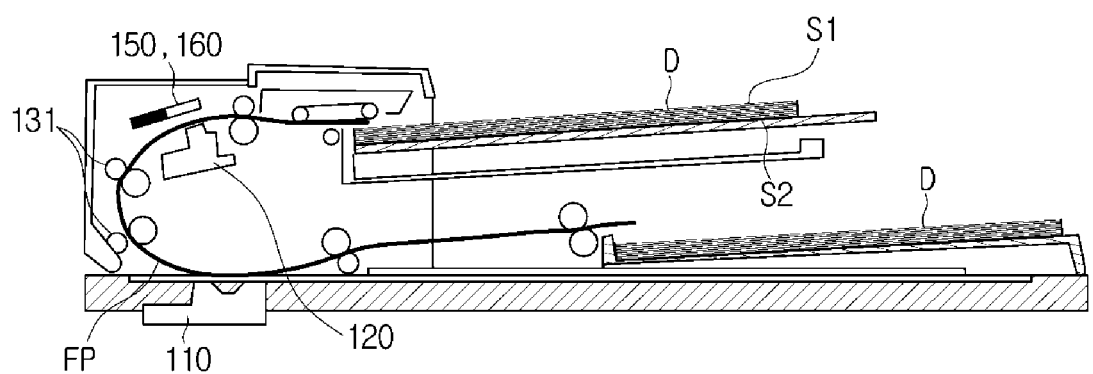
FIGS. 21 and 22 illustrate arrangement of a reflecting member included in an image acquiring apparatus, according to other embodiments of the present disclosure.
Figure 22:
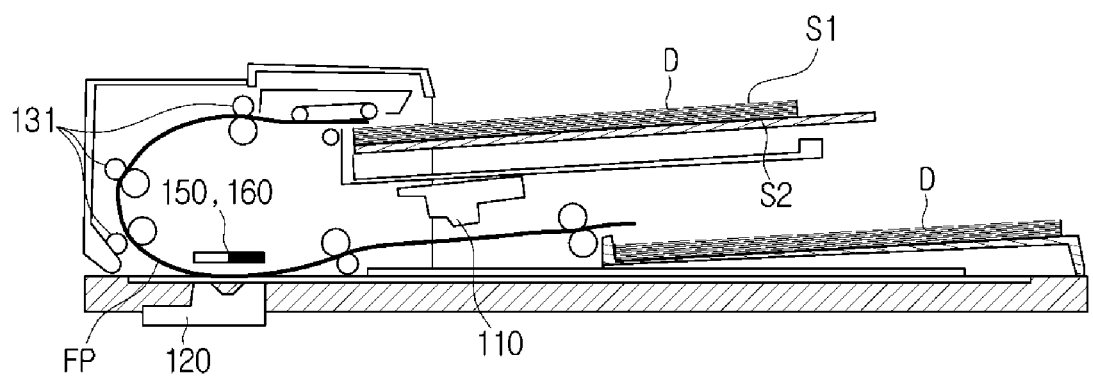
Figure 23:
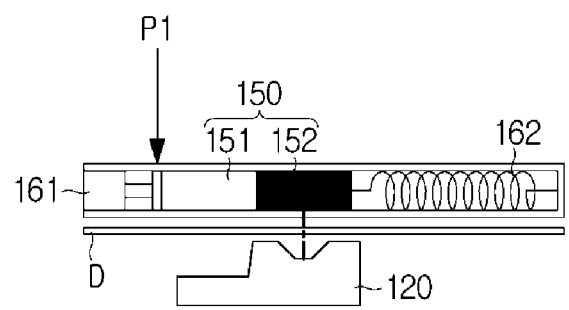
FIGS. 23 and 24 illustrate movement of a reflecting member by a reflecting member moving module included in an image acquiring apparatus, according to an embodiment of the present disclosure.
Figure 24:
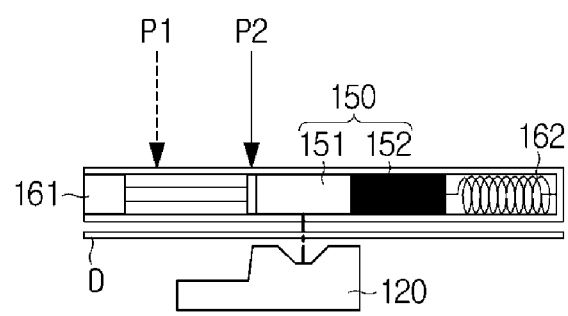

FIG. 20 is a block diagram of an image acquiring apparatus, according to another embodiment of the present disclosure. FIGS. 21 and 22 illustrate arrangement of a reflecting member included in an image acquiring apparatus, according to other embodiments of the present disclosure, and FIGS. 23 and 24 illustrate movement of a reflecting member by a reflecting member movement module included in an image acquiring apparatus, according to an embodiment of the present disclosure.

Referring to FIG. 20, an image acquiring apparatus 3 may include an image acquirer 103 for acquiring an image formed on the surface of the document D, an image processor 200 for analyzing and processing the image acquired by the image acquirer 103, a user interface 400 for receiving a use input from the user and indicating operational information of the image acquiring apparatus 3, a storage 500 for storing the image acquired by the image acquirer 103, and a controller 300 for controlling overall operation of the image acquiring apparatus 3.

The image acquirer 103 may include first and second image sensor modules 110 and 120 for capturing the image formed on the document D, a document feed module 130 for feeding the document D, a sensor moving module 140 for moving the first image sensor module 110, a reflecting member 150 for enabling a clearer penetrated image to be obtained, and a reflecting member moving module 160 for moving the reflecting member 150.

The first and second image sensor modules 110 and 120 may each capture an image formed on the document D. Furthermore, the image acquirer 103 may output image data that corresponds to the image obtained by the first and second image sensor modules 110 and 120 to the image processor 200. The first and second image sensor modules 110 and 120 may each include a linear image sensor.

Since the first and second image sensor modules 110 and 120 each include the linear image sensor, the image acquirer 103 may include a document feed module 130 for feeding the document D and a sensor moving module 140 for moving the first image sensor module 110, in order to obtain a 2D image of the document D.

The document feed module 130 may feed the document D put on the input tray 1c to the output tray 1d along the feed path FP, and the sensor moving module 140 may move the first image sensor module 110 to obtain the 2D image of the document D.

The reflecting member 150 may include the first reflecting part 151 and the second reflecting part 152.

The first reflecting part 151 may be made of a material having high optical reflectivity in order for the image acquirer 103 to acquire a clearer penetrated image, and the second reflecting part 152 may be made of a material having low optical reflectivity to prevent images formed on both sides of the document D from interfering with each other during acquisition of images on both sides.

The reflecting member moving module 160 may move the reflecting member 150 back and forth according to whether a single-side image is to be acquired or double-side images are to be acquired.

For example, in the case of acquiring a single-side image, the reflecting member moving module 160 may move the reflecting member 150 such that the first reflecting part 151 of the reflecting member 150 is aligned with the image sensor module 110, 120 of the image acquirer 103. Furthermore, in the case of acquiring double-side images, the reflecting member moving module 160 may move the reflecting member 150 such that the second reflecting part 152 of the reflecting member 150 is aligned with the image sensor module 110, 120 of the image acquirer 103.

The reflecting member moving module 160 and reflecting member 150 may be situated near the first image sensor module 110 or the second image sensor module 120 depending on the arrangement of the first and second image sensor modules 110 and 120.

For example, as shown in FIG. 21, if the second image sensor module 120 is situated at an upper reach than the first image sensor module 110 is with respect to the feed direction FD of the document D, the reflecting member moving module 160 and reflecting member 150 may be arranged near the second image sensor module 120.

Furthermore, as shown in FIG. 22, if the first image sensor module 110 is situated at an upper reach than the second image sensor module 120 is with respect to the feed direction FD of the document D, the reflecting member moving module 160 and reflecting member 150 may be arranged near the first image sensor module 110.

As a result, the reflecting member moving module 160 and reflecting member 150 may be arranged near the image sensor module 110, 120 that is acquiring the penetrated image PI of the document D during acquisition of a single-side image.

The reflecting member moving module 160 may include a first moving module 161 to move the reflecting member 150 from a first position PI to a second position P2, and a second moving module 162 to move the reflecting member 150 from the second position P2 to the first position PI.

For example, as shown in FIGS. 23 and 24, the first moving module 161 may include a motor, a coil, and/or the like that may use magnetic force to move the reflecting member 150 from the first position PI to the second position P2, and the second moving module 162 may include e.g., a spring that uses electricity to return the reflecting member 150 to the first position P1.

Referring to FIG. 23, with the reflecting member 150 positioned in the first position PI, the second reflecting part 152 of the reflecting member 150 is aligned with the image sensor module 110, 120. That is, the reflecting member 150 in the first position PI may minimize interferences between images on the first and second sides.

Furthermore, referring to FIG. 24, with the reflecting member 150 positioned in the second position P2, the first reflecting part 151 of the reflecting member 150 is aligned with the image sensor module 110, 120. That is, the reflecting member 150 in the second position P2 may enable the image sensor module 110, 120 to obtain a clear penetrated image.

However, the operation of the reflecting member moving module 160 is not limited to moving the reflecting member 150 back and forth. For example, if the reflecting member 150 is shaped like a cylinder or polyprism in which the first and second reflecting parts 151 and 152 are alternately arranged along the outer face, the reflecting member moving module 160 may rotate the reflecting member 150.

The user interface 400 may interact with the user. For example, the user interface 400 may receive color scan settings for the image acquiring apparatus 3 to acquire an image formed on the document D as a color image, mono scan settings for the image acquiring apparatus 3 to acquire an image formed on the document D as a black and white (or monochrome) image, and automatic scan settings for the image acquiring apparatus 3 to acquire an image formed on the document D as a black and white image or color image depending on whether the image on the document D is a monochrome image or a color image. Furthermore, the user interface 400 may receive a resolution from the user for the image acquiring apparatus 3 to apply the resolution in acquiring an image formed on the document D.

The user interface 400 may include a plurality of buttons 410 to receive predetermined user inputs from the user, and a display 420 for displaying operation information of the image acquiring apparatus 3.

The storage 500 may store a control program and control data for controlling the image acquiring apparatus 3, and various application programs and application data for performing various functions according to the user input.

The storage 500 may include a non-volatile memory that preserves the stored program or data even if the power is out. For example, the storage 500 may include a magnetic disc drive 510 or a semiconductor drive 520.

The image processor 200 may analyze or process an image acquired by the image acquirer 103.

For example, the image processor 200 may analyze an image acquired by the image acquirer 103, and determine whether the acquired image is text or pictures. The image processor 200 may analyze the image acquired by the image acquirer 103, and determine whether the acquired image is a monochrome image e.g., only in white, black, and gray, or a color image e.g., in multiple colors.

Furthermore, the image processor 200 may perform sharpening or blurring on the image acquired by the image acquirer 103.

The image processor 200 may include a graphic processor 210 for performing operation to process the image acquired by the image acquirer 103, and a graphic memory 220 for storing a program or data related to computational operation of the graphic processor 210.

The controller 300 may control operation of the aforementioned image acquirer 103, user interface 400, storage 500, and image processor 200.

For example, the controller 300 may control the reflecting member moving module 160 to move the reflecting member 150 according to whether a single-side image is to be acquired or double-side images are to be acquired.

For example, the controller 300 may control the image acquirer 103 to acquire a monochrome image or color image depending on the image acquisition type, and may control the image acquirer 103 to adjust the document feed speed or sensor moving speed depending on the image acquisition resolution.

Furthermore, the controller 300 may control the image processor 200 to perform sharpening or blurring on the image depending on whether the penetrated image PI is text or pictures.

The controller 300 may include a control processor 310 for performing operation to control operation of the image acquiring apparatus 3, and a control memory 320 for storing a program and data related to computational operation of the control processor 310.

Another embodiment of the features of the image acquiring apparatus 3 was described above.

Operation of the image acquiring apparatus 3 according to the embodiment will now be described.

Figure 25:
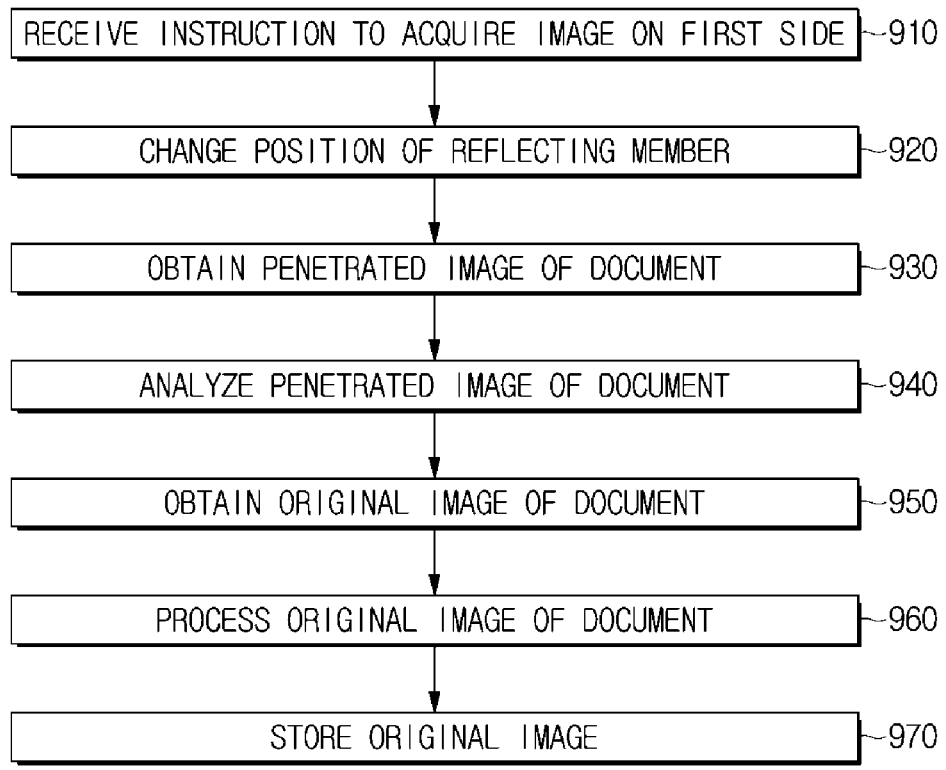
FIG. 25 is a flowchart illustrating an image acquiring method carried out by an image acquiring apparatus, according to yet another embodiment of the present disclosure.

FIG. 25 is a flowchart illustrating an image acquiring method carried out by an image acquiring apparatus, according to yet another embodiment of the present disclosure.

An image acquiring method 900 of the image acquiring apparatus 3 is described in connection with FIG. 19.

The image acquiring apparatus 3 receives an instruction from the user to acquire an image on a single side of the document D, in operation 910.

For example, the user may put the document D on the input tray 1c of the image acquiring apparatus 3 with a side having an image OI to be acquired facing upward, and input an instruction to initiate image acquisition through the user interface 400.

To help understand the present disclosure, it is assumed herein that an image is formed on the first side S1 of the document D.

The image acquiring apparatus 3 changes the position of the reflecting member 150, in operation 920.

As described above in connection with FIG. 24, the controller 300 of the image acquiring apparatus 3 may control the reflecting member moving module 160 such that the first reflecting part 151 of the reflecting member 150 is aligned with the second image sensor module 120.

As a result, the second image sensor module 120 may acquire a clear penetrated image PI of the document D with the help of the first reflecting part 151 of the reflecting member 150.

The image acquiring apparatus 3 acquires the penetrated image PI of the document D, in operation 930.

While the document D is being fed along the feed path FP, the second image sensor module 120 of the image acquirer 103 may acquire the penetrated image PI of the first side S1 through the second side S2.

The image acquiring apparatus 3 then analyzes the penetrated image PI of the document D, in operation 940.

The image processor 200 of the image acquiring apparatus 3 may receive image data of the penetrated image PI from the image acquirer 103 and analyze the received image data of the penetrated image PI.

The image processor 200 may determine whether the image of the document D is a text image or a picture image or whether the image of the document D is a monochrome image or a color image, based on analysis of the penetrated image PI.

The image processor 200 may provide the result of analyzing the penetrated image PI to the controller 300.

The image acquiring apparatus 3 acquires an original image OI of the document D, in operation 950.

The document D fed by the document feed device 130 reaches the first image sensor module 110, which is then able to acquire the original image OI formed on the first side S1 of the document D.

Before the first image sensor module 110 obtains the original image OI of the document D, the controller 300 may change settings about acquiring the original image OI depending on the result of analyzing the penetrated image PI.

For example, the controller 300 may control the image acquirer 103 to acquire a monochrome image or color image depending on whether the penetrated image PI is a monochrome image or color image, and control the image acquirer 103 to adjust the document feed speed or sensor moving speed depending on whether the penetrated image PI is a text image or a picture image.

The image acquiring apparatus 3 processes the original image OI of the document D, in operation 960.

The image processor 200 of the image acquiring apparatus 3 may process the original image OI received from the image acquirer 101 in real time, to make the image viewed more clearly to the user.

In this regard, the image processor 200 may process the original image OI differently depending on the result of analyzing the penetrated image PI.

For example, if the result of analyzing the penetrated image PI reveals that the original image OI includes characters or symbols only, the image processor 200 may perform sharpening on the image to increase sharpness of the image, and if the result of analyzing the penetrated image PI reveals that the original image OI includes pictures only, the image processor 200 may perform blurring on the image to make the pictures look natural.

The image acquiring apparatus 3 then stores the processed original image OI, in operation 970.

After completion of acquisition and process of the original image OI, the controller 300 may store image data of the processed original image OI in the storage 500. Especially, the controller 300 may store the original image OI in the storage 500 in various formats.

As described above, to acquire an image on one side of the document D, the image acquiring apparatus 3 may acquire and analyze the penetrated image PI of the document D through the other side on which the original image OI is not formed, and depending on the analysis result, may change setting values about acquisition of the original image OI or change processing of the original image OI.

Furthermore, the image acquiring apparatus 3 may include the reflecting member 150 to obtain a clearer penetrated image PI, and the reflecting member moving module 160 to move the reflecting member 150.

It was described above that the image acquiring apparatus may include a plurality of image sensor modules to obtain an image on one side of a document.

In the following, an image forming apparatus that includes a plurality of image sensor modules to obtain an image on one side of a document and print the acquired image onto a print medium will be described.

Figure 26:
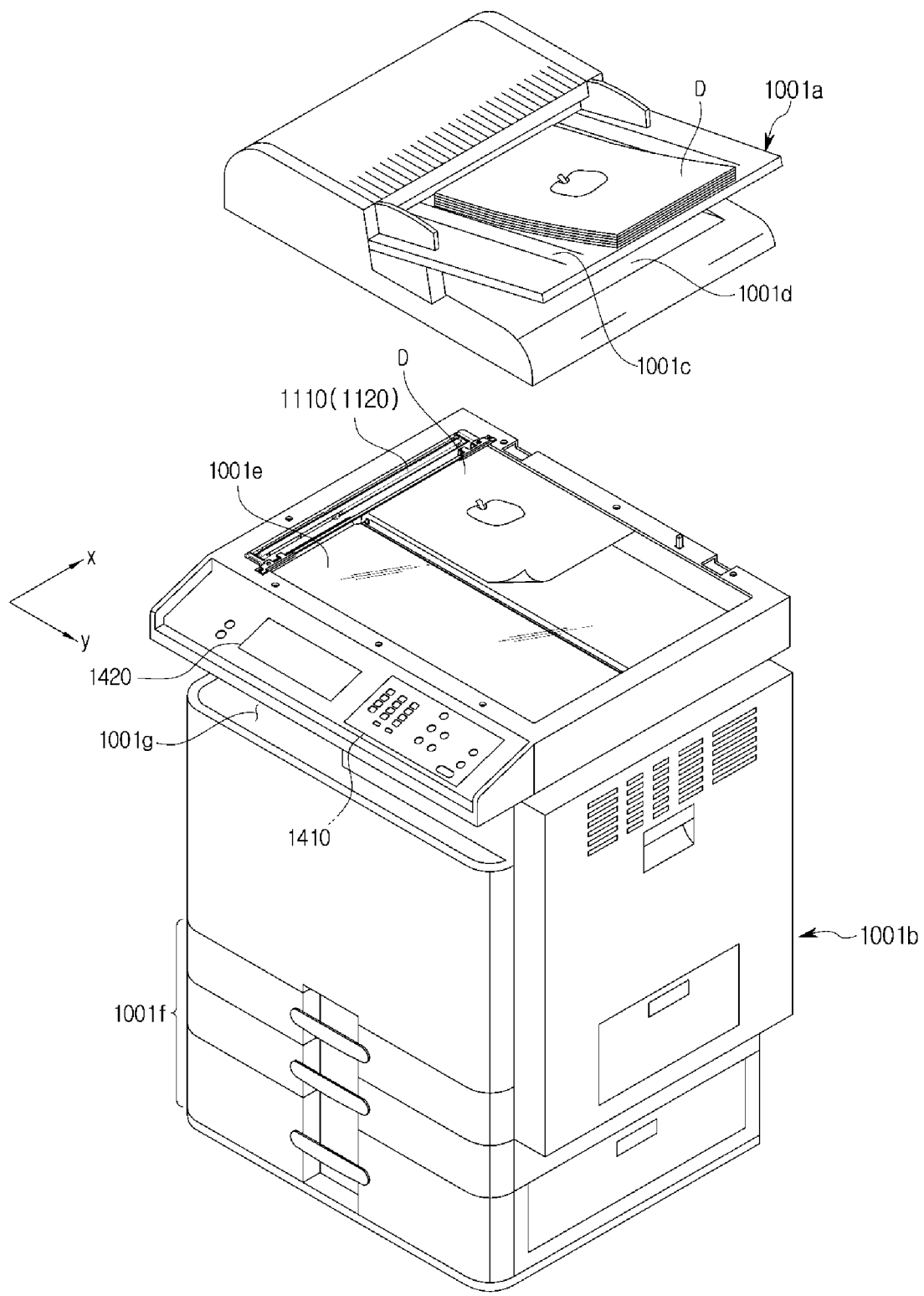
FIG. 26 illustrates an exterior view of an image forming apparatus, according to an embodiment of the present disclosure.
Figure 27:
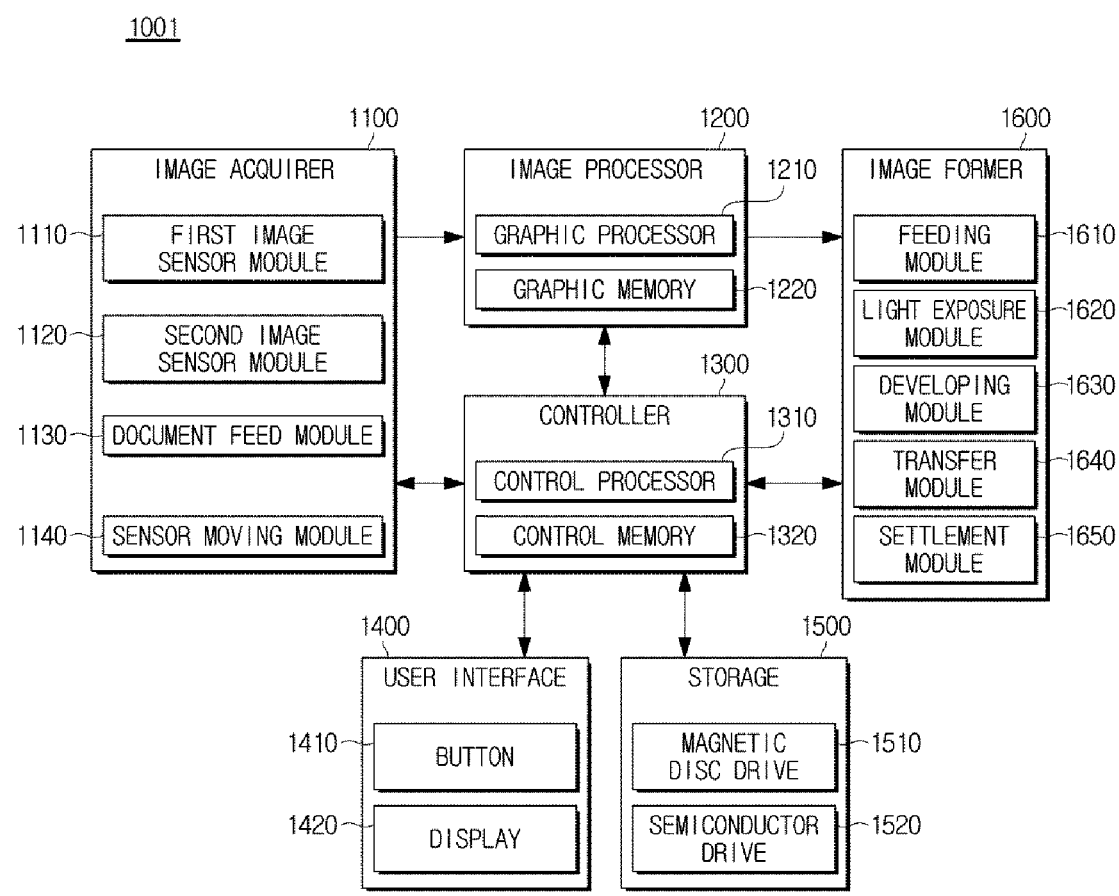
FIG. 27 is a block diagram of an image forming apparatus, according to an embodiment of the present disclosure.
Figure 28:
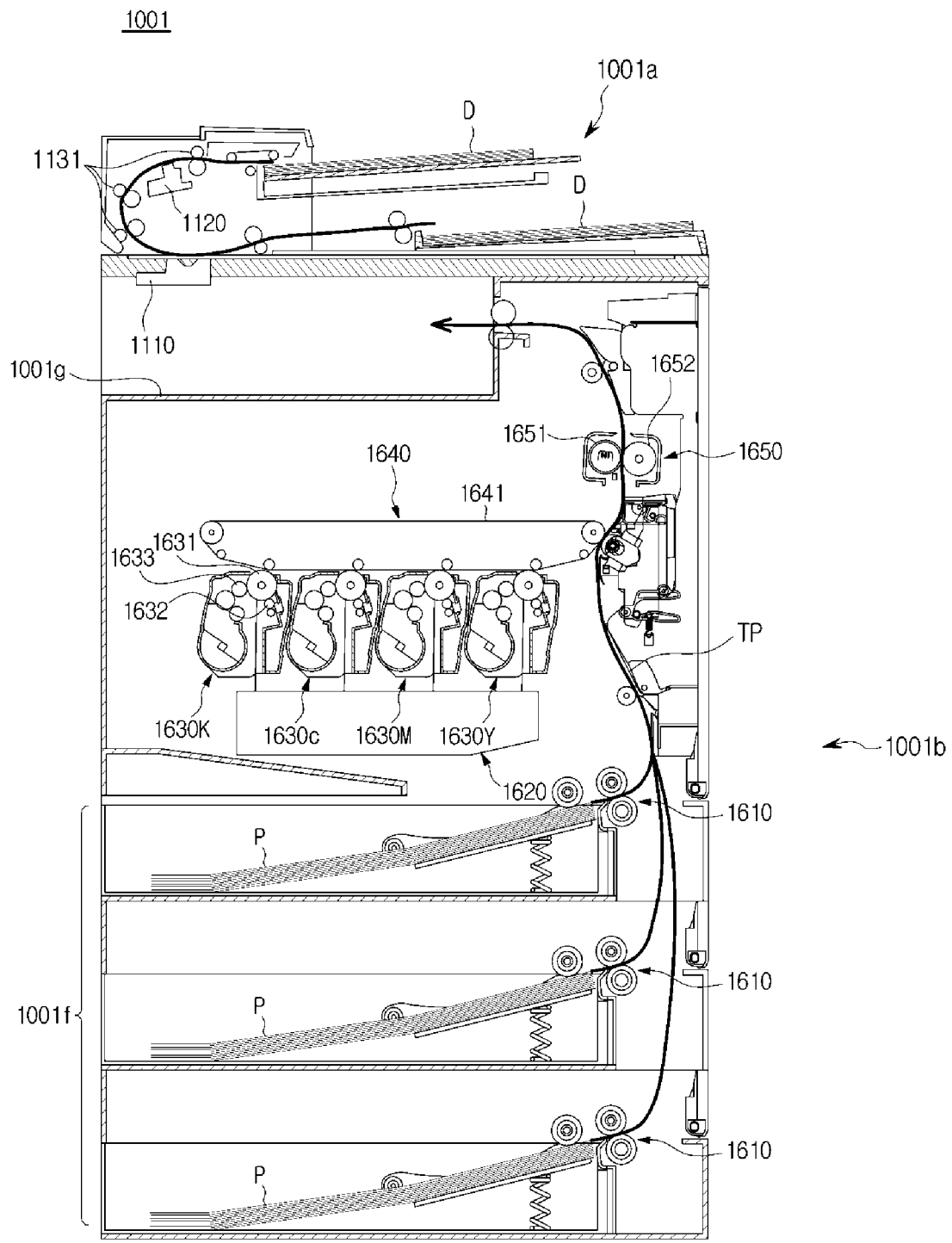
FIG. 28 illustrates arrangement of first and second image sensor modules included in an image forming apparatus, according to an embodiment of the present disclosure.

FIG. 26 illustrates an exterior view of an image forming apparatus, according to an embodiment of the present disclosure, and FIG. 27 is a block diagram of an image forming apparatus, according to an embodiment of the present disclosure. Furthermore, FIG. 28 illustrates arrangement of first and second image sensor modules included in an image forming apparatus, according to an embodiment of the present disclosure.

The image forming apparatus 1001 may acquire an image formed on the surface of a document D, and form the acquired image onto a print medium P. The document D as herein used refers to paper, film, cloth, etc., the surface of which has an image formed thereon, such as characters, pictures, etc., and the print medium P refers to paper, film, cloth, etc., into which an image such as characters, pictures, etc., may be formed.

As a typical example of the image forming apparatus 1001, there is a copying machine for acquiring an image formed on the surface of the document D and printing out the acquired image.

However, the image forming apparatus 1001 is not limited to the copying machine, and may correspond to a multifunctional device that acquires an image formed on the surface of the document D and stores, transmits, or prints out the acquired image.

Referring to FIG. 26, the image forming apparatus 1 may include, in appearance, a main body 1001b and a flatbed cover 1001a for covering the top face of the main body 1001b.

The main body 1001b forms the exterior of the image forming apparatus 1001, and may protect key components of the image forming apparatus 1001, as will be described below.

A flatbed 1001e made of a transparent material may be arranged on the top of the main body 1001b to allow the image forming apparatus 1001 to acquire an image formed on the surface of the document D, and an image sensor module 1110 or 1120 may be arranged below the transparent flatbed 1001e to capture the image formed on the surface of the document D.

There may also be a paper box 1001f located in the bottom part of the main body 1001b for containing the print medium P, and an output tray 1001g onto which the print medium P with an image formed thereon comes out.

The flatbed cover 1001a may include an ADF to automatically feed the document D. The image sensor module 1110 or 1120 may be located on one side of a feed path (FP) along which the document D is fed.

Furthermore, the flatbed cover 1001a may include an input tray 1001c on which the document D is placed and an output tray 1001d onto which the document D, from the surface of which an image has been acquired, is released.

Referring to FIG. 27, the image forming apparatus 1001 may functionally include an image acquirer 1100 for acquiring an image formed on the surface of the document D, a user interface 1400 for receiving a use input from the user and indicating operational information of the image forming apparatus 1001, a storage 1500 for storing the image acquired by the image acquirer 1100, an image former 1600 for forming an image onto the print medium P, an image processor 1200 for analyzing and processing the image acquired by the image acquirer 1100, and a controller 1300 for controlling overall operation of the image forming apparatus 1001.

The image acquirer 1100 may include first and second image sensor modules 1110 and 1120 for capturing the image formed on the surface of the document D, a document feed module 1130 for feeding the document D, and a sensor moving module 1140 for moving the first image sensor module 1110.

The first and second image sensor modules 1110 and 1120 may each capture an image formed on the document D. Furthermore, the image acquirer 1100 may output image data that corresponds to the image captured by the first and second image sensor modules 1110 and 1120 to the image processor 1200. The first and second image sensor modules 1110 and 1120 may each include a linear image sensor.

Since the first and second image sensor modules 1110 and 1120 each include the linear image sensor, the image acquirer 1100 may include a document feed module 1130 for feeding the document D and a sensor moving module 1140 for moving the first image sensor module 1110, in order to obtain a 2D image of the document D.

The document feed module 1130 may feed the document D put on the input tray 1001c to the output tray 1001d along the feed path FP, and the sensor moving module 1140 may move the first image sensor module 1110 to obtain the 2D image of the document D.

The user interface 1400 may interact with the user. For example, the user interface 1400 may receive color scan settings for the image forming apparatus 1001 to acquire an image formed on the document D as a color image, mono scan settings for the image forming apparatus 1001 to acquire an image formed on the document D as a black and white (or monochrome) image, and automatic scan settings for the image forming apparatus 1001 to acquire an image formed on the document D as a black and white image or a color image depending on whether the image on the document D is a monochrome image or a color image. Furthermore, the user interface 1400 may receive a resolution from the user for the image forming apparatus 1001 to apply the resolution in acquiring an image formed on the document D.

The user interface 1400 may include a plurality of buttons 1410 to receive predetermined user inputs from the user, and a display 1420 for displaying operation information of the image forming apparatus 1001.

The storage 1500 may store a control program and control data for controlling the image forming apparatus 1001, and various application programs and application data for performing various functions according to the user input.

The storage 1500 may include a non-volatile memory that preserves the stored program or data even if the power is out. For example, the storage 1500 may include a magnetic disc drive 1510 or a semiconductor drive 1520.

The image former 1600 may form an image onto the print medium P based on the image data. The image former 1600 may pick up the print medium P contained in the paper box 1001f, form an image on the picked-up print medium P, and release the print medium P on which the image has been formed onto the output tray 1001e.

The image former 1600 may include a feeding module 1610, a light exposure module 1620, a developing module 1630, a transfer module 1640, and a settlement module 1650.

The feeding module 1610 may pick up the print medium P in the paper box 100f and feed the picked-up print medium P to the output tray 1001e via the transfer module 1640 and settlement module 1650.

The light exposure module 1620 emits light of a pattern that corresponds to an image on the document D acquired by the image acquirer 1100. The light exposure module 1620 may include a Laser Scanning Unit (LSU) or LED Print Head (LPH).

An electrostatic latent image may be formed by the light emitted by the light exposure module 1620 on the outer circumferential face of a photosensitive drum 1631 of the developing module 1630, which will be described below.

The developing module 1630 develops the electrostatic latent image formed by the light exposure module 1620 with toner.

The developing module 1630 may include a first developing module 1630K for developing the electrostatic latent image with black toner, a second developing module 1630C for developing the electrostatic latent image with cyan toner, a third developing module 1630M for developing the electrostatic latent image with magenta toner, and a fourth developing module 1630Y for developing the electrostatic latent image with yellow toner.

The first developing module 1630K may include the photosensitive drum 1631 on which an electrostatic latent image is formed by light, a charging roller 1632 for charging the outer circumferential face of the photosensitive drum 1631 with electricity, and a developing roller 1633 for developing the electrostatic latent image with toner on a transfer belt 1641, which will be described below. Features of the second, third, and fourth developing modules 1630C, 1630M, and 1630Y are identical to that of the first developing module 1630K.

The transfer module 1640 may transfer (or copy) a toner image onto the print medium P fed by the feeding module 1610, and include the transfer belt 1641 for transferring the toner image of the photosensitive drum 1631 onto the print medium P.

The settlement module 1650 may settle the toner image transferred onto the print medium P with heat and pressure, and may include a heating roller 1651 for heating the print medium P with the toner image transferred thereon, and a pressing roller 1642 for pressing the print medium P with the toner image transferred thereon.

The image former 1600 may use the procedure of exposure-development-settlement to form an image on the print medium P while the print medium P is being fed.

The image processor 1200 may analyze or process the image acquired by the image acquirer 1100.

For example, the image processor 1200 may analyze the image acquired by the image acquirer 1100, and determine whether the acquired image is text or pictures. The image processor 1200 may analyze the image acquired by the image acquirer 1100, and determine whether the acquired image is a monochrome image e.g., only in white, black, and gray, or a color image e.g., in multiple colors.

Furthermore, the image processor 1200 may increase sharpness of the image acquired by the image acquirer 1100, or add a blurring effect onto the acquired image.

The image processor 1200 may include a graphic processor 1210 for performing operation to process the image acquired by the image acquirer 1100, and a graphic memory 1220 for storing a program or data related to computational operation of the graphic processor 1210.

The controller 1300 may control operation of the aforementioned image acquirer 1100, user interface 1400, storage 1500, and image processor 1200.

For example, the controller 1300 may control the image acquirer 1100 to acquire a monochrome image or color image depending on the image acquisition type, and may control the image acquirer 1100 to adjust the document feed speed or sensor moving speed depending on the image acquisition resolution.

Furthermore, the controller 1300 may control the image processor 1200 to increase sharpness of the image or add a blurring effect onto the image depending on whether the penetrated image PI is text or pictures.

The controller 1300 may include a control processor 1310 for performing operation to control operation of the image forming apparatus 1001, and a control memory 1320 for storing a program and data related to computational operation of the control processor 1310.

Another embodiment of the features of the image forming apparatus 1001 was described above.

Operation of the image acquiring apparatus 1001 according to the embodiment will now be described.

Figure 29:
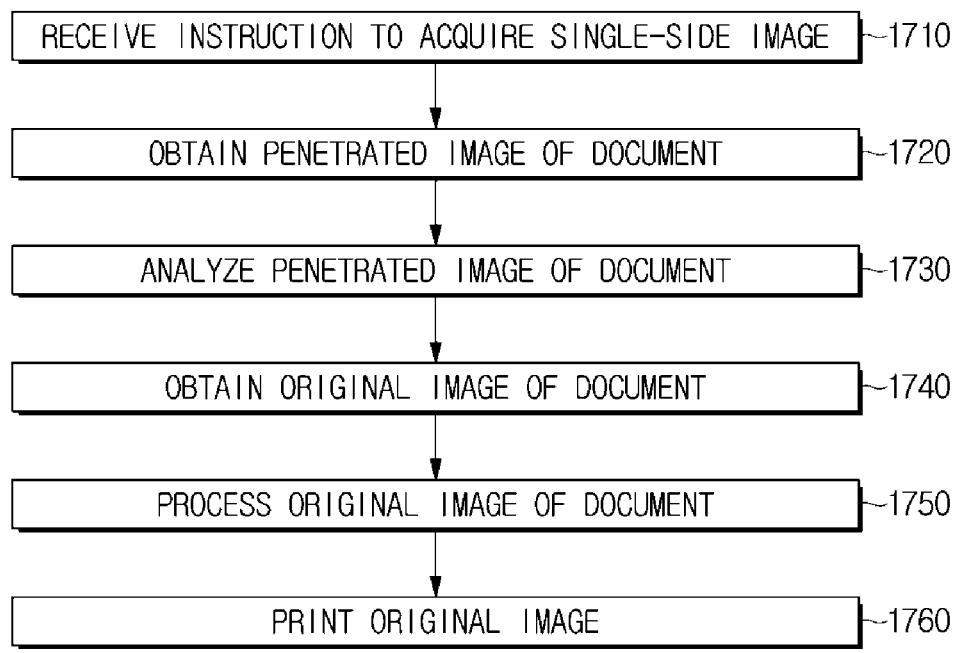
FIG. 29 is a flowchart illustrating an image forming method carried out by an image forming apparatus, according to an embodiment of the present disclosure.

FIG. 29 is a flowchart illustrating an image forming method carried out by an image forming apparatus, according to an embodiment of the present disclosure.

An image forming method 1700 of the image acquiring apparatus 1001 is described in connection with FIG. 29.

The image forming apparatus 1001 receives an instruction from the user to acquire an image on a single side of the document D, in operation 1710.

For example, the user may put the document D on the input tray 1001c of the image forming apparatus 1001 with a side having an image OI to be acquired facing upward, and input an instruction to initiate image acquisition through the user interface 1400.

To help understand the present disclosure, it is assumed herein that an image is formed on the first side S1 of the document D.

The image forming apparatus 1001 acquires a penetrated image PI of the document D, in operation 1720.

While the document D is being fed along the feed path FP, the second image sensor module 1120 of the image acquirer 1100 may obtain the penetrated image PI of the first side S1 through the second side S2.

The image forming apparatus 1001 then analyzes the penetrated image PI of the document D, in operation 1730.

The image processor 1200 of the image forming apparatus 1001 may receive image data of the penetrated image PI from the image acquirer 1100 and analyze the received image data of the penetrated image PI.

The image processor 1200 may determine whether the image of the document D is a text image or a picture image or whether the image of the document D is a monochrome image or a color image, based on analysis of the penetrated image PI.

The image processor 1200 may provide the result of analyzing the penetrated image PI to the controller 1300.

The image forming apparatus 1001 acquires an original image OI of the document D, in operation 1740.

The document D fed by the document feed device 1130 reaches the first image sensor module 1110, which is then able to acquire the original image OI formed on the first side S1 of the document D.

Before the first image sensor module 1110 obtains the original image OI of the document D, the controller 1300 may change settings about acquiring the original image OI depending on the result of analyzing the penetrated image PI.

For example, the controller 1300 may control the image acquirer 1100 to acquire a monochrome image or color image depending on whether the penetrated image PI is a monochrome image or color image, and control the image acquirer 1100 to adjust the document feed speed or sensor moving speed depending on whether the penetrated image PI is a text image or a picture image.

The image forming apparatus 1001 processes the original image OI of the document D, in operation 1750.

The image processor 1200 of the image forming apparatus 1001 may process the original image OI received from the image acquirer 1100 in real time, to make the image viewed more clearly to the user.

In this regard, the image processor 1200 may process the original image OI differently depending on the result of analyzing the penetrated image PI.

For example, if the result of analyzing the penetrated image PI reveals that the original image OI includes characters or symbols only, the image processor 1200 may perform image processing to increase sharpness of the image, and if the result of analyzing the penetrated image PI reveals that the original image OI includes pictures only, the image processor 1200 may perform image processing to add a blurring effect onto the image.

The image forming apparatus 1001 then prints an image that corresponds to the original image OI onto the print medium P, in operation 1760.

The image former 1600 of the image forming apparatus 1001 may receive image data that corresponds to the original image OI processed by the image processor 1200, and form an image that corresponds to the received image data onto the print medium P.

Specifically, the light exposure module 1620 may create an electrostatic latent image by emitting light of a pattern corresponding to the original image OI; the developing module 1630 may develop the electrostatic latent image with toner; the transfer module 1640 may transfer the toner image onto the print medium P; the settlement module 1650 may settle the toner image onto the print medium P.

As described above, to acquire an image on one side of the document D, the image forming apparatus 1001 may acquire and analyze the penetrated image PI of the document D through the other side on which the original image OI is not formed, and depending on the analysis result, may change setting values about acquisition of the original image OI or change processing of the original image OI.

Furthermore, the image forming apparatus 1001 may form an image that corresponds to the original image OI onto the print medium P.

According to an embodiment of the present disclosure, an image acquiring apparatus and method and image forming apparatus may be provided, which uses a plurality of image sensors to acquire clearer and more natural images in acquisition of one-side image of a document.

According to another embodiment of the present disclosure, an image acquiring apparatus and method and image forming apparatus may be provided to process an image of a document based on a penetrated image seen on the rear side of the document in acquisition of one-side image of the document.

According to yet another embodiment of the present disclosure, an image acquiring apparatus and method and image forming apparatus may be provided to allow a clear rear-side image in acquisition of one-side image of a document.

Several embodiments have been described, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

What is claimed is:

1. An image acquiring method by an image acquiring apparatus, the method comprising:
in response to an instruction to acquire a single-side image formed on a first surface of a document,
acquiring, by a first image sensor, the single-side image and acquiring, by a second image sensor as a penetrated image sensor, a penetrated image of same single-side image shown through a second surface of the document, while the document is being fed; and
image processing, by a processor, the single-side image, based on the acquired penetrated image of the same single-side image shown through the second surface of the document,
wherein,
the acquiring of the penetrated image includes determining whether the penetrated image is a text image or a picture image, and
the image processing of the single-side image includes sharpening the single-side image when the penetrated image is the text image.

2. The image acquiring method of claim 1, wherein the image processing of the single-side image comprises blurring the single-side image when the penetrated image is the picture image.

3. The image acquiring method of claim 1, wherein the acquiring of the penetrated image comprises determining whether the penetrated image is a monochrome image or a color image.

4. The image acquiring method of claim 3, wherein the acquiring of the single-side image comprises:
changing line times corresponding to the first image sensor to mono image line times when the penetrated image is a monochrome image.

5. The image acquiring method of claim 3, wherein the acquiring of the single-side image comprises:
changing line times corresponding to the first image sensor to color image line times when the penetrated image is a color image.

6. An image acquiring apparatus comprising:
a memory; and
a processor coupled to the memory, the processor to,
in response to an instruction to acquire a single-side image formed on a first surface of a document,
control acquiring, by a first image sensor, the single-side image and acquire, by a second image sensor as a penetrated image sensor, a penetrated image of same single-side image shown through a second surface of the document, while the document is being fed; and
perform an image process on the single-side image, based on the acquired penetrated image of the same single-side image shown through the second surface of the document,
wherein,
the acquiring of the penetrated image includes determining whether the penetrated image is a text image or a picture image, and
the image processing of the single-side image includes sharpening the single-side image when the penetrated image is the text image.

7. The image acquiring apparatus of claim 6, wherein the processor is to perform the image process to blur the single-side image when the penetrated image of the image is a picture image.

8. The image acquiring apparatus of claim 6, wherein the processor is to determine whether the penetrated image is a monochrome image or a color image.

9. The image acquiring apparatus of claim 8, wherein the processor is to change line times corresponding to the first image sensor to mono image line times when the penetrated image of the single-side image is a monochrome image.

10. The image acquiring apparatus of claim 8, wherein the processor is to change line times corresponding to the first image sensor to color image line times when the penetrated image is a color image.

11. The image acquiring apparatus of claim 6, further comprising:
a reflector to reflect light which is emitted from the penetrated image sensor and penetrates the document.

12. The image acquiring apparatus of claim 11, wherein the reflector comprises a first reflecting part and a second reflecting part, the first reflecting part having higher optical reflectivity than the second reflecting part.

13. The image acquiring apparatus of claim 12, wherein the apparatus includes a reflector moving module to, move the reflector to align the first reflecting part with the penetrated image sensor when the instruction is to acquire the single-side image, and move the reflector to align the second reflecting part with the penetrated image sensor when the instruction is to acquire a double-side image formed on the first and second surfaces of the document.

14. The image acquiring apparatus of claim 12, wherein the apparatus includes a sensor moving module to, move the penetrated image sensor to align the first reflecting part with the penetrated image sensor when the instruction is to acquire the single-side image, and move the pentrated image sensor to align the second reflecting part with the penetrated image sensor when the instruction is to acquire a double-side image formed on the first and second surfaces of the document.

15. An image forming apparatus comprising:

a memory; and a processor coupled to the memory, the processor to, in response to an acquisition instruction to acquire a single-side image formed on a first surface of a document, control acquiring, by a first image sensor, the single-side image and acquire, by a second image sensor as a penetrated image sensor, a penetrated image of same single-side image shown through a second surface of the document, while the document is being fed;

print the single-side image acquired by the first image sensor onto a print medium; and perform an image process on the single-side image, based on the acquired penetrated image of the same single-side image shown through the second surface of the same document, and print the image processed single-side image on the print medium, wherein, the acquiring of the penetrated image includes determining whether the penetrated image is a text image or a picture image, and the image processing of the single-side image includes sharpening the single-side image when the penetrated image is the text image.

16. The image acquiring apparatus of claim 15, wherein the processor is to, determine whether the penetrated image is a monochrome image or a color image, change line times corresponding to the first image sensor to mono image line times when the penetrated image of the single-side image is a monochrome image, and change line times corresponding the first image sensor to color image line times when the penetrated image is a color image.

* * * * *

UNITED STATES PATENT AND TRADEMARK OFFICE
CERTIFICATE OF CORRECTION

PATENT NO. : 10,484,567 B2
APPLICATION NO. : 15/091022
DATED : November 19, 2019
INVENTOR(S) : Kyoung-Youn Lee et al.

It is certified that error appears in the above-identified patent and that said Letters Patent is hereby corrected as shown below:

On the Title Page

In Column 1, item (72), Inventors, Line 1, delete "Yogin-si" and insert -- Yongin-si --, therefor.

In the Claims

In Column 35, Line 12 (approx.), Claim 14, delete "pentrated" and insert -- penetrated --, therefor.

Signed and Sealed this
Eleventh Day of February, 2020

Andrei Iancu
*Director of the United States Patent and Trademark Office*